US012569769B2

(12) United States Patent
Zhou

(10) Patent No.: US 12,569,769 B2
(45) Date of Patent: Mar. 10, 2026

(54) VIRTUAL PROP DISPLAY METHOD FOR SEARCHING A VIRTUAL CONTAINER

(71) Applicant: Tencent Technology (Shenzhen) Company Limited, Guangdong (CN)

(72) Inventor: Jianfeng Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 551 days.

(21) Appl. No.: 17/963,906

(22) Filed: Oct. 11, 2022

(65) Prior Publication Data

US 2023/0040742 A1      Feb. 9, 2023

Related U.S. Application Data

(63) Continuation of application No. PCT/CN2021/122803, filed on Oct. 9, 2021.

(30) Foreign Application Priority Data

Oct. 30, 2020    (CN) .......................... 202011192937.5

(51) Int. Cl.
| | |
|---|---|
| *A63F 13/69* | (2014.01) |
| *A63F 13/533* | (2014.01) |
| *A63F 13/58* | (2014.01) |

(52) U.S. Cl.
CPC ............ *A63F 13/69* (2014.09); *A63F 13/533* (2014.09); *A63F 13/58* (2014.09);
(Continued)

(58) Field of Classification Search
CPC ........ A63F 13/69; A63F 13/533; A63F 13/58; A63F 2300/308; A63F 2300/609;
(Continued)

(56) References Cited

U.S. PATENT DOCUMENTS

2014/0315646 A1    10/2014  Mizuno

FOREIGN PATENT DOCUMENTS

| CN | 108459811 A | 8/2018 |
|---|---|---|
| CN | 108888956 A | 11/2018 |

(Continued)

OTHER PUBLICATIONS

"SEARCH Guide | Tarkov Skills .12" by Mr. Dashing Dot to YouTube (https://www.youtube.com/watch?v=DH6-WXB4Vf0) on Jan. 9, 2020 (Year: 2020).*

(Continued)

*Primary Examiner* — Peter J Iannuzzi
(74) *Attorney, Agent, or Firm* — ArentFox Schiff LLP

(57)      ABSTRACT

A virtual prop display method includes controlling display of a scene interface of a virtual scene, the virtual scene comprising a virtual container. The method further includes, in response to receiving an operation controlling a virtual object to search the virtual container, controlling display of a search interface of the virtual container. The controlling display of the search interface includes controlling display, in the search interface, of a prop identifier at a storage location in the virtual container at a first stage of displaying the search interface, the prop identifier indicating that a virtual prop is stored at the storage location. The controlling display of the search interface further includes, after controlling display of the prop identifier, controlling display of the virtual prop at the storage location at a second stage of displaying the search interface, the second stage being after the first stage.

20 Claims, 11 Drawing Sheets

(52) U.S. Cl.
CPC ... *A63F 2300/308* (2013.01); *A63F 2300/609*
(2013.01); *A63F 2300/65* (2013.01)

(58) Field of Classification Search
CPC ............ A63F 2300/65; A63F 2300/807; A63F
13/52; A63F 13/25; A63F 2250/30
See application file for complete search history.

(56) References Cited

FOREIGN PATENT DOCUMENTS

| | | | |
|---|---|---|---|
| CN | 111202982 | A | 5/2020 |
| CN | 111589132 | A | 8/2020 |
| CN | 111790161 | A | 10/2020 |
| CN | 112295215 | A | 2/2021 |

OTHER PUBLICATIONS

"Tarkov Tidbits—Episode 3 | Fast Examine Items, Magazines, Gunsmith Part 11 Folded Val Confusion" by Veritas to YouTube ( https://www.youtube.com/watch?v=i0UrZkm-391) on Apr. 29, 2019 (Year: 2019).*

International Search Report and Written Opinion issued in International Application No. PCT/CN2021/122803, mailed Jan. 6, 2022, with English Translation, 13 pages.

Yao Er You, Beginner Plays Escape from Tarkov with Full Backpack of Equipment. can't Find Extraction Point, Dies, https://www.bilibili.com/video/BV1g74llp7LW? from=search&seid= 2866060439827760752&spm_id_Jrom=333.337.0.0, with English Translation, Feb. 4, 2020.

* cited by examiner

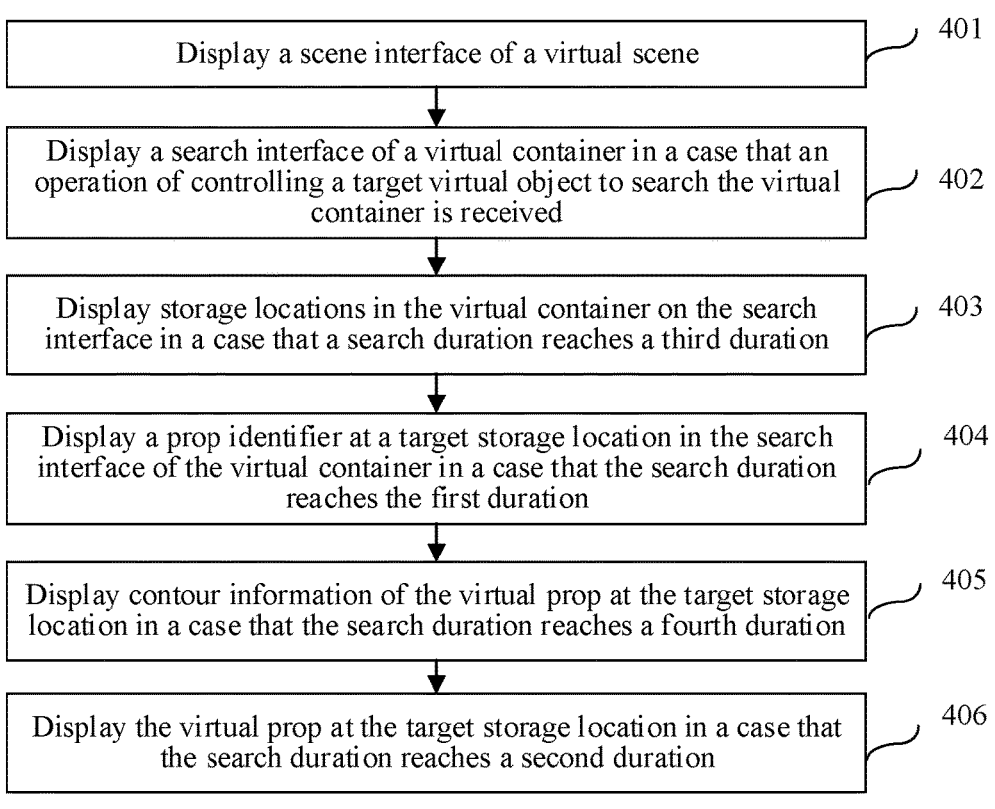

| | |
|---|---|
| Display a scene interface of a virtual scene | 401 |
| Display a search interface of a virtual container in a case that an operation of controlling a target virtual object to search the virtual container is received | 402 |
| Display storage locations in the virtual container on the search interface in a case that a search duration reaches a third duration | 403 |
| Display a prop identifier at a target storage location in the search interface of the virtual container in a case that the search duration reaches the first duration | 404 |
| Display contour information of the virtual prop at the target storage location in a case that the search duration reaches a fourth duration | 405 |
| Display the virtual prop at the target storage location in a case that the search duration reaches a second duration | 406 |

FIG. 4

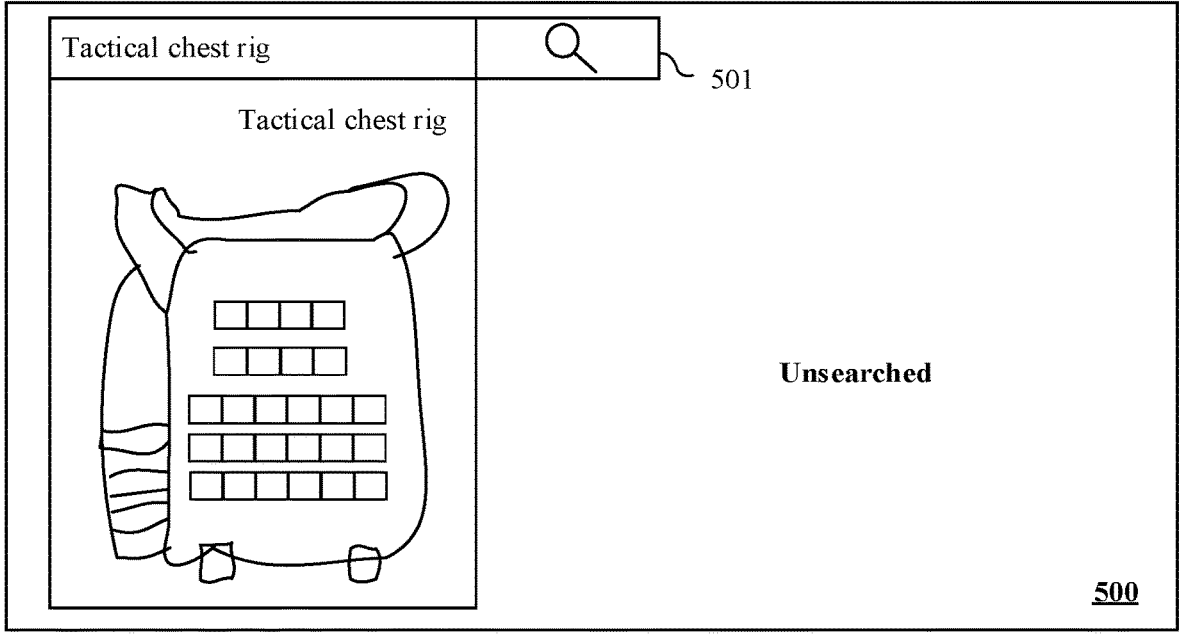

Tactical chest rig

Tactical chest rig

501

Unsearched

Scene interface display module — 1601

Search interface display module — 1602

Prop identifier display module — 1603

Virtual prop display module — 1604

VIRTUAL PROP DISPLAY METHOD FOR SEARCHING A VIRTUAL CONTAINER

RELATED APPLICATIONS

This application is a continuation of International Application No. PCT/CN2021/122803, entitled "VIRTUAL PROP DISPLAY METHOD AND APPARATUS, DEVICE, AND STORAGE MEDIUM" and filed on Oct. 9, 2021, which claims priority to Chinese Patent Application No. 202011192937.5, filed on Oct. 30, 2020, and entitled "VIRTUAL PROP DISPLAY METHOD AND APPARATUS, DEVICE, AND STORAGE MEDIUM." The entire disclosures of the prior applications are hereby incorporated by reference in their entirety.

FIELD OF THE TECHNOLOGY

This application relates to the field of virtual scene technologies, including a virtual prop display method and apparatus, a device, and a storage medium.

BACKGROUND OF THE DISCLOSURE

In many applications (for example, a virtual reality application, a three-dimensional map program, a first-person shooting game, and a multiplayer online battle arena game) in which a virtual scene is constructed, by placing virtual props in the virtual scene, a user can control a virtual character to acquire the virtual props.

In the related art, the virtual props may be placed on the ground in the virtual scene. For example, the virtual props may be placed in a virtual container generated after the virtual character dies, and when the user controls the virtual character to approach the virtual container on the ground in the virtual scene, an interaction control is usually displayed on the virtual scene. A target operation performed by the user based on the interaction control may cause the virtual props in the virtual container to be displayed in the virtual scene interface, so that the user can control the virtual character to acquire the virtual props in the container.

However, in the related art, after the user performs the target operation on the interaction control, all prop identifiers in the container are directly displayed in the virtual scene interface of the terminal, which poses a relatively high requirement or load on image processing of the terminal and may cause freezing of the game picture.

SUMMARY

Embodiments of this disclosure provide a virtual prop display method and apparatus, a device, and a storage medium, through which virtual props can be gradually displayed according to attribute data of the virtual props, thereby lowering a load on terminal performance for displaying virtual prop images, and improving the display effect of the virtual props.

In an embodiment, a virtual prop display method includes controlling display of a scene interface of a virtual scene, the virtual scene comprising a virtual container. The method further includes, in response to receiving an operation controlling a virtual object to search the virtual container, controlling display of a search interface of the virtual container. The controlling display of the search interface includes controlling display, in the search interface, of a prop identifier at a storage location in the virtual container at a first stage of displaying the search interface, the prop identifier indicating that a virtual prop is stored at the storage location. The controlling display of the search interface further includes, after controlling display of the prop identifier, controlling display of the virtual prop at the storage location at a second stage of displaying the search interface, the second stage being after the first stage.

In an embodiment, a virtual prop display apparatus includes processing circuitry configured to control display of a scene interface of a virtual scene, the virtual scene comprising a virtual container. The processing circuitry is further configured to, in response to receiving an operation controlling a virtual object to search the virtual container, control display of a search interface of the virtual container. The controlling display of the search interface includes controlling display, in the search interface, of a prop identifier at a storage location in the virtual container at a first stage of displaying the search interface, the prop identifier indicating that a virtual prop is stored at the storage location. The controlling display of the search interface further includes, after controlling display of the prop identifier, controlling display of the virtual prop at the storage location at a second stage of displaying the search interface, the second stage being after the first stage.

In an embodiment, a non-transitory computer-readable storage medium stores computer-readable instructions thereon, which, when executed by processing circuitry, cause the processing circuitry to perform a virtual prop display method. The virtual prop display method includes controlling display of a scene interface of a virtual scene, the virtual scene comprising a virtual container. The method further includes, in response to receiving an operation controlling a virtual object to search the virtual container, controlling display of a search interface of the virtual container. The controlling display of the search interface includes controlling display, in the search interface, of a prop identifier at a storage location in the virtual container at a first stage of displaying the search interface, the prop identifier indicating that a virtual prop is stored at the storage location. The controlling display of the search interface further includes, after controlling display of the prop identifier, controlling display of the virtual prop at the storage location at a second stage of displaying the search interface, the second stage being after the first stage.

At least one of a first duration and a second duration is determined based on a type attribute of a virtual prop in a virtual container. When a virtual character needs to acquire the virtual prop in the virtual container, a search interface is first displayed; when a search duration reaches the first duration, a prop identifier is displayed at a storage location corresponding to the virtual prop in the search interface. When the search duration reaches the second duration, the virtual prop is then displayed in the search interface. By using the foregoing solution, a terminal can determine the first duration and the second duration according to a type attribute of the virtual prop, and gradually display relevant information of the virtual prop according to the two durations, thereby lowering a load on terminal performance for displaying a virtual prop image, reducing a possibility of display freezing of a virtual scene picture, and improving the display effect of the virtual prop.

It is to be understood that, the foregoing general descriptions and the following detailed descriptions are merely for illustration and explanation purposes and are not intended to limit this disclosure.

BRIEF DESCRIPTION OF THE DRAWINGS

Accompanying drawings herein are incorporated into the specification and constitute a part of this specification, show embodiments that conform to this disclosure, and are used for describing a principle of this disclosure together with this specification.

FIG. 4 is a flowchart of a virtual prop display method according to an exemplary embodiment.

FIG. 5 is a schematic diagram of a search interface of a virtual container involved in an embodiment of this disclosure.

DESCRIPTION OF EMBODIMENTS

Figure 1:
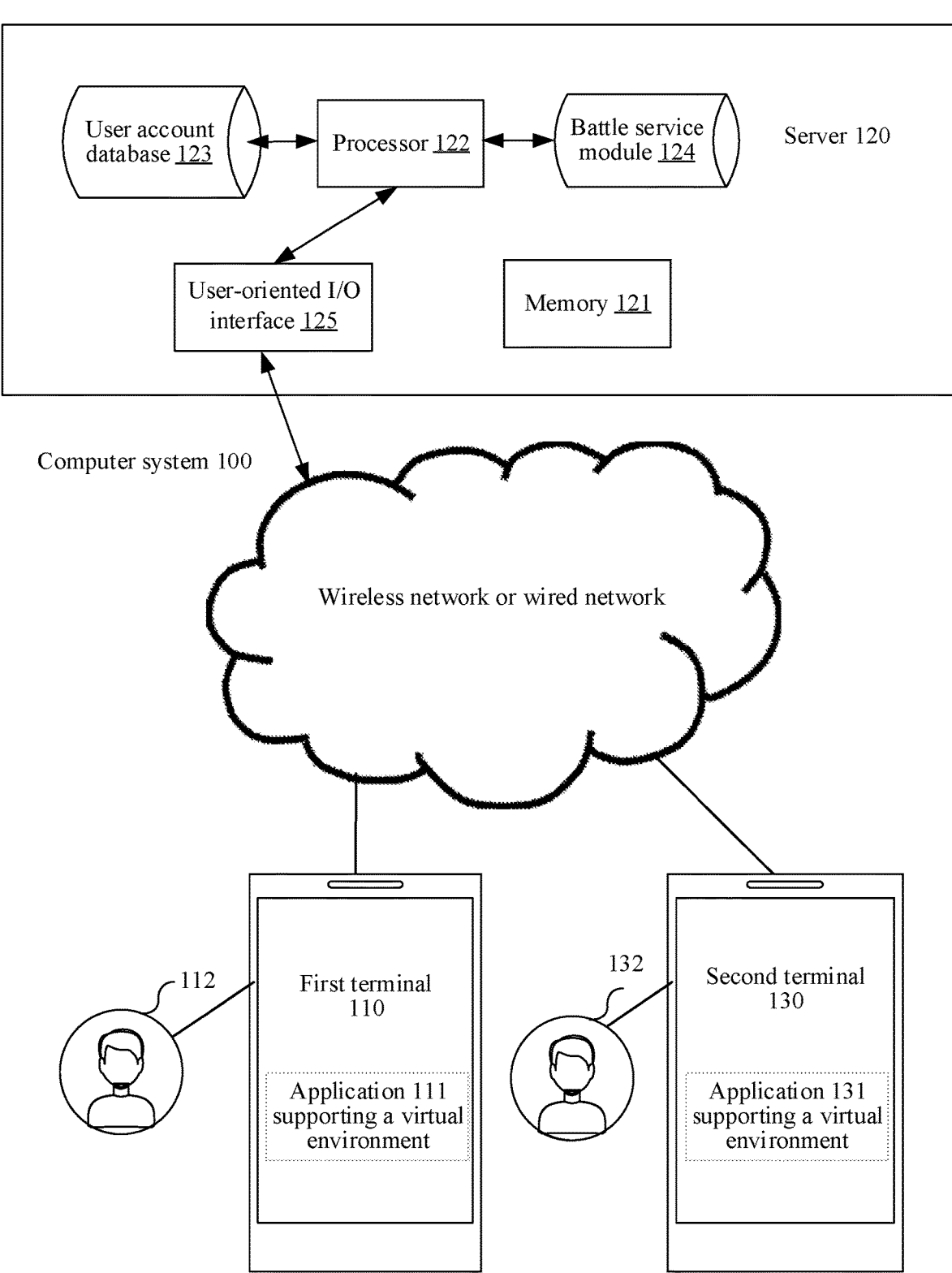
FIG. 1 is a schematic diagram of a virtual prop display system according to an exemplary embodiment.

Exemplary embodiments are described in detail herein, and examples thereof are shown in the accompanying drawings. When the following descriptions are made with reference to the accompanying drawings, unless indicated otherwise, same numbers in different accompanying drawings represent the same or similar elements. The implementations described in the following exemplary embodiments do not represent all implementations that are consistent with this disclosure. On the contrary, the implementations are merely examples of apparatuses and methods that are described in detail in the appended claims and that are consistent with some aspects of this disclosure.

A virtual scene includes a virtual scene displayed (or provided) when an application is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene, and description is made by using an example in which the virtual scene is a three-dimensional virtual scene in the following embodiments, but this is not limited. The virtual scene may be further used for a virtual scene battle between at least two virtual roles. The virtual scene may be further used for a battle performed between at least two virtual roles by using virtual guns. The virtual scene may be further used for a battle performed between at least two virtual roles by using virtual guns in a range of a target region, and the range of the target region may be continuously decreased as time goes by in the virtual scene.

A virtual object includes a movable object in a virtual scene. The movable object may be at least one of a virtual person, a virtual animal, and a virtual vehicle. In an embodiment, when the virtual scene is a three-dimensional virtual scene, the virtual object is a three-dimensional model created based on a skeletal animation technology. Each virtual object has a shape, a volume and an orientation in the three-dimensional virtual scene, and occupies some space in the three-dimensional virtual scene.

The virtual scene is generally generated by an application in a computer device such as a terminal and displayed based on hardware (for example, a screen) in the terminal. The terminal may be a mobile terminal such as a smartphone, a tablet computer, or an ebook reader. Alternatively, the terminal may be a personal computer device such as a notebook computer or a fixed computer.

A virtual prop includes a prop that a virtual object can use in a virtual environment, including a virtual weapon such as a pistol, a rifle, a sniper rifle, a dagger, a knife, a sword, or an axe that can cause damage to another virtual object, a supply prop such as bullets, a virtual pendant such as a fast mag, a scope, or a muffler that is mounted on a target virtual weapon and can provide some attribute bonuses to the virtual weapon, or a defensive prop such as a shield, an armor, or an armored vehicle.

A first-person shooting (FPS) game includes a shooting game in which a user can play from a first-person perspective. A virtual environment picture in the game is a picture obtained by observing a virtual environment from a perspective of a first virtual object. In the game, at least two virtual objects play in a single-round battle mode in the virtual environment. The virtual object eludes damages from other virtual objects and dangers (for example, a poison gas area and a swamp) in the virtual environment to survive in the virtual environment. When a health point of the virtual object in the virtual environment is zero, the life of the virtual object in the virtual environment ends, and the final virtual object surviving in the virtual environment wins. In an embodiment, the battle starts with a moment when the first client joins the battle, and ends with a moment when the last client exits the battle. Each client may control one or more virtual objects in the virtual environment. Arena modes of the battle may include a single-player battle mode, a two-player team battle mode, or a multi-player team battle mode. The battle mode is not limited in the embodiments of this disclosure.

FIG. 1 is a schematic diagram of a virtual prop display system according to an exemplary embodiment. The virtual prop display system may include: a first terminal 110, a server 120, and a second terminal 130.

An application 111 supporting a virtual environment is installed and run on the first terminal 110, and the application 111 may be a multiplayer online battle program. When the first terminal runs the application 111, a user interface of the application 111 is displayed on a screen of the first terminal 110. The application 111 may be any one of a multiplayer online battle arena (MOBA) game, a battle royale shooting game, and a simulation game (SLG). In this embodiment, an example in which the application 111 is an FPS game is used for description. The first terminal 110 is a terminal used by a first user 112. The first user 112 uses the first terminal 110 to control a first virtual object located in the virtual environment to perform activities, and the first virtual object may be referred to as a main control virtual object of the first user 112. The activities of the first virtual object include, but not limited to: at least one of adjusting body postures, crawling, walking, running, riding, flying, jumping, driving, picking, shooting, attacking, throwing, and skill casting. For example, the first virtual object is a first virtual person such as a simulated person or a cartoon person.

An application 131 supporting a virtual environment is installed and run on the second terminal 130, and the application 131 may be a multiplayer online battle program. When the second terminal 130 runs the application 131, a user interface of the application 131 is displayed on a screen of the second terminal 130. The application may be any one of a MOBA game, a battle royale shooting game, and an SLG. In this embodiment, an example in which the application 131 is an FPS game is used for description. The second terminal 130 is a terminal used by a second user 132. The second user 132 uses the second terminal 130 to control a second virtual object located in the virtual environment to perform activities, and the second virtual object may be referred to as a main control virtual character of the second user 132. For example, the second virtual object is a second virtual person, such as a simulated person or a cartoon person.

In an embodiment, the first virtual object and the second virtual object are located in the same virtual world. The first virtual object and the second virtual object may belong to the same camp, the same team, or the same organization, have a friend relationship with each other, or have a temporary communication permission. The first virtual object and the second virtual object may belong to different camps, different teams, or different organizations, or have a hostile relationship with each other.

In an embodiment, the applications installed on the first terminal 110 and the second terminal 130 are the same, or the applications installed on the two terminals are the same type of applications on different operating system platforms (Android system or iOS system). The first terminal 110 may generally refer to one of a plurality of terminals, and the second terminal 130 may generally refer to another one of the plurality of terminals. In this embodiment, the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer.

FIG. 1 shows two terminals. However, a plurality of other terminals may access the server 120 in different embodiments. In an embodiment, one or more terminals are terminals corresponding to a developer. A developing and editing platform for the application supporting a virtual environment is installed on the terminal. The developer may edit and update the application on the terminal and transmit an updated application installation package to the server 120 by using a wired or wireless network. The first terminal 110 and the second terminal 130 may download the application installation package from the server 120 to update the application.

The first terminal 110, the second terminal 130, and the another terminal are connected to the server 120 through a wireless network or a wired network.

The server 120 includes at least one of one server, a server cluster including a plurality of servers, a cloud computing platform, and a virtualization center. The server 120 is configured to provide a backend service for an application supporting a three-dimensional virtual environment. In an embodiment, the server 120 takes on primary computing work, and the terminals take on secondary computing work. Alternatively, the server 120 takes on secondary computing work, and the terminals take on primary computing work. Alternatively, collaborative computing is performed by using a distributed computing architecture between the server 120 and the terminals.

In a schematic example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is used for storing data of user accounts used by the first terminal 110, the second terminal 130, and/or the another terminal, for example, profile pictures of the user accounts, nicknames of the user accounts, combat power indices of the user accounts, and service regions in which the user accounts are located. The battle service module 124 is configured to provide a plurality of battle rooms to users for a battle, for example, a 1V1 battle, a 3V3 battle, or a 5V5 battle. The user-oriented I/O interface 125 is configured to establish communication with the first terminal 110 and/or the second terminal 130 by using a wireless network or wired network to exchange data.

Figure 2:
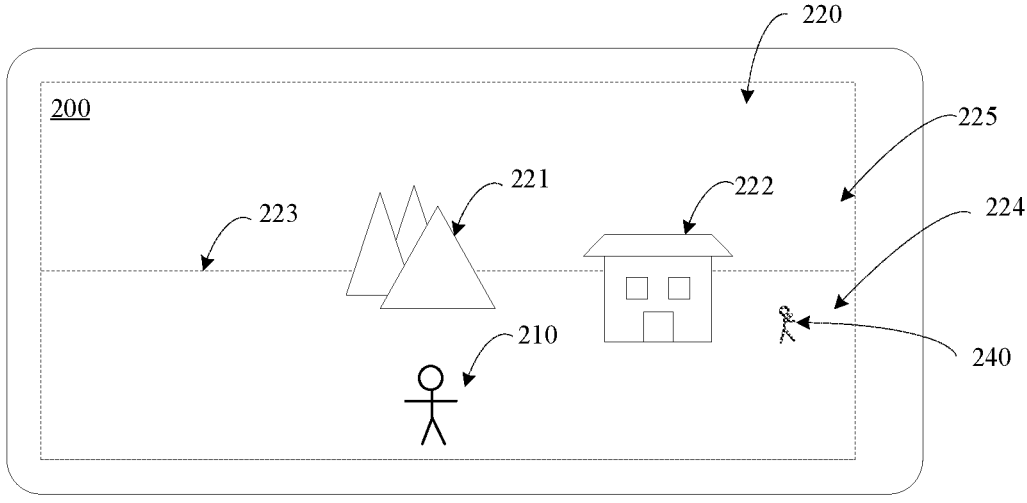
FIG. 2 is a schematic diagram of a display interface of a virtual scene according to an exemplary embodiment.

The virtual scene may be a three-dimensional virtual scene, or the virtual scene may be a two-dimensional virtual scene. An example in which the virtual scene is a three-dimensional virtual scene is used. FIG. 2 is a schematic diagram of a display interface of a virtual scene according to an exemplary embodiment. As shown in FIG. 2, the display interface of the virtual scene includes a scene picture 200, and the scene picture 200 includes a current controlled virtual object 210, an environment picture 220 of the three-dimensional virtual scene, and a virtual object 240. The virtual object 240 may be a virtual object controlled by a user corresponding to another terminal or a virtual object controlled by an application.

In FIG. 2, the current controlled virtual object 210 and the virtual object 240 are three-dimensional models in the three-dimensional virtual scene, and the environment picture of the three-dimensional virtual scene displayed in the scene picture 200 includes objects observed from a perspective of the current controlled virtual object 210. For example, as shown in FIG. 2, under the observation from the perspective of the current controlled virtual object 210, the displayed environment picture 220 of the three-dimensional virtual scene includes the earth 224, the sky 225, the horizon 223, a hill 221, and a factory 222.

The current controlled virtual object 210 can cast a skill or use a virtual prop, move, and perform a target action under the control of the user. The virtual object in the virtual scene under the control of the user may display different three-dimensional models. For example, the screen of the terminal supports a touch operation, and the scene picture 200 of the virtual scene includes a virtual control, then when the user touches the virtual control, the current controlled virtual object 210 may perform the target action in the virtual scene and display the current corresponding three-dimensional model.

In this embodiment of this disclosure, the display process of the search interface may be divided into different display stages, and in different display stages, different contents are displayed in the search interface, so as to gradually display the relevant information of the virtual prop, and lower a requirement on terminal performance for displaying a virtual prop image. In other words, the process of displaying the search interface may be implemented as follows: displaying (or controlling display of) a scene interface of a virtual scene, the virtual scene including a virtual container; displaying (or controlling display of) a search interface of the virtual container in a case that an operation of controlling a target virtual object to search the virtual container is received; displaying (or controlling display of) a prop identifier at a target storage location in the search interface at a first stage of displaying the search interface, the prop identifier being used for indicating that a virtual prop is stored at the target storage location; and displaying (or controlling display of) the virtual prop at the target storage location at a second stage of displaying the search interface, the second stage being after the first stage. The first stage of displaying the search interface and the second stage of displaying the search interface may be divided from each other based on the search duration, or may be divided from each other based on the loading situation of the search interface. When the first stage and the second stage are divided from each other based on the loading situation of the search interface, the stage during which the prop identifier is loaded may be determined as the first stage of displaying the search interface, and the stage during which the virtual prop is loaded may be determined as the second stage of displaying the search interface. The relevant personnel may alternatively divide the first stage from the second stage based on other division methods, and the division method of the first stage and the second stage is not limited in this disclosure.

Figure 3:
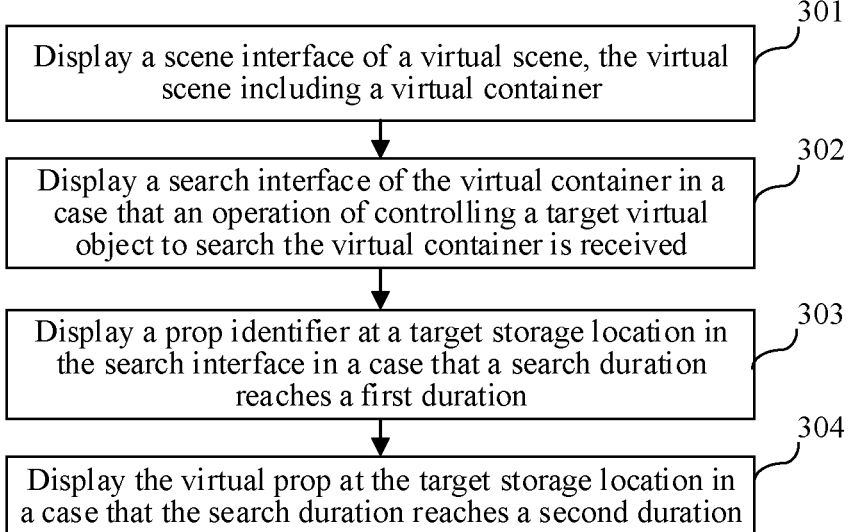
FIG. 3 is a flowchart of a virtual prop display method according to an exemplary embodiment.

In this embodiment of this disclosure, the virtual prop display method provided in this disclosure is described by using an example in which the first stage of displaying the search interface and the second stage of displaying the search interface are divided from each other by the search duration. FIG. 3 is a flowchart of a virtual prop display method according to an exemplary embodiment. The method may be performed by a computer device. The computer device may be the terminal or the server shown in FIG. 1. As shown in FIG. 3, the computer device may display a virtual prop by performing the following steps.

In Step 301, a scene interface of a virtual scene is displayed (or controlled to be displayed), the virtual scene including a virtual container.

In a possible implementation, the virtual container is a container configured to store virtual materials in the virtual scene, that is, the virtual container is a container configured to store virtual props in the virtual scene. For example, when a shooting game is used as the scene, for virtual materials such as bullets, the virtual container may be a bullet box for storing bullets.

The scene interface of the virtual scene includes a scene picture corresponding to the virtual scene. In a possible implementation, the indication identifier of the virtual container is displayed in the scene picture of the virtual scene. Because the virtual scene is displayed on a display screen of the terminal, the user needs to determine differences between the virtual container and other elements in the virtual picture to determine the position of the virtual container in the scene picture. For the user, there is a certain difficulty in identifying each element in the virtual picture. Therefore, the indication identifier of the virtual container may be displayed in the virtual picture, so as to reduce the difficulty in identifying the virtual container for the user.

In a possible implementation, when a distance between a virtual character and the virtual container is less than a distance threshold, the indication identifier corresponding to the virtual container may be displayed on the scene picture of the virtual scene. For example, when there is a bullet box (virtual container) in the scene picture of the virtual scene, and the distance between the virtual character controlled by the user through the terminal and the bullet box (virtual container) is less than the distance threshold, in the scene picture of the virtual scene, the indication identifier corresponding to the bullet box is displayed corresponding to a display position of the bullet box. The indication identifier may be implemented as at least one of a text indication identifier or an image indication identifier. For example, the text indication identifier corresponding to the bullet box may be displayed in the upper region corresponding to the bullet box.

In a possible implementation, when the scene picture of the virtual scene includes a virtual container, the part corresponding to the virtual container is highlighted. In other words, the part corresponding to the virtual container is emphasized and displayed. For example, the contour corresponding to the virtual container is highlighted, or the appearance model corresponding to the virtual container is appropriately enlarged.

In Step 302, a search interface of the virtual container is displayed (or controlled to be displayed) in response to receiving an operation of controlling a target virtual object to search the virtual container.

The search interface is used for displaying virtual props contained in the virtual container.

The target virtual object is a virtual character controlled by the user through the terminal and can act in the virtual scene, and the target virtual object may perform an interaction operation with the virtual container or a virtual object controlled by another user.

In Step 303, a prop identifier is displayed (or controlled to be displayed) at a target storage location in the virtual container in response to a search duration of the virtual object searching the virtual container reaches a first duration.

The prop identifier is used for indicating that a virtual prop is stored at the target storage location.

In Step 304, the virtual prop is displayed (or controlled to be displayed) at the target storage location in response to a determination that the search duration reaches a second duration.

The second duration is greater than the first duration, and at least one of the first duration and the second duration is determined based on a target type attribute of the virtual prop.

In a possible implementation, at least one of the first duration and the second duration is delivered to the terminal after being determined based on the target type attribute of the virtual prop by the server.

In another possible implementation, at least one of the first duration and the second duration is delivered to the terminal after being determined based on the target type data corresponding to the virtual prop in the virtual container by the server. The terminal is determined according to the target type data.

Based on the above, in the solution shown in this embodiment of this disclosure, at least one of a first duration and a second duration is determined based on a target type attribute of a virtual prop in a virtual container; when a virtual character needs to acquire the virtual prop in the virtual container, a search interface is first displayed; when a search duration reaches the first duration, a prop identifier is displayed at a storage location corresponding to the virtual prop in the search interface; and when the search duration reaches the second duration, the virtual prop is then displayed in the search interface. By using the foregoing solution, a terminal can determine the first duration and the second duration according to a target type attribute of the virtual prop, and gradually display relevant information of the virtual prop according to the two durations, thereby lowering a load on terminal performance for displaying a virtual prop image, reducing a possibility of display freezing of a virtual scene picture, and improving the display effect of the virtual prop.

FIG. 4 is a flowchart of a virtual prop display method according to an exemplary embodiment. The method may be performed by a computer device. The computer device may be the terminal or the server shown in FIG. 1. As shown in FIG. 4, the computer device may display a virtual prop by performing the following steps.

In Step 401, a scene interface of a virtual scene is displayed (or controlled to be displayed).

The virtual scene includes a virtual container.

In a possible implementation, the scene picture of the virtual scene is a picture obtained from the perspective of the target virtual object controlled by the user observing the virtual scene.

In a possible implementation, when there is a virtual container in the scene picture of the virtual scene, that is, when the target virtual object controlled by the user observes the virtual container, the terminal requests the server for container data corresponding to the virtual container. After receiving the request, the server sends the container data corresponding to the virtual container to the terminal.

The container data may include a total quantity of storage locations in the virtual container, the quantity of unavailable locations, the quantity of available locations, and virtual item information corresponding to the unavailable locations.

In a possible implementation, when there is a virtual container in the scene picture of the virtual scene, and the target virtual object controlled by the user interacts with the virtual container, the terminal requests the server for container data corresponding to the virtual container. After receiving the request, the server sends the container data corresponding to the virtual container to the terminal. In other words, when the target virtual object controlled by the user interacts with the virtual container, the server needs to deliver the container data corresponding to the virtual container to the terminal, thereby reducing the amount of data transmission borne by the server.

In Step 402, a search interface of the virtual container is displayed (or controlled to be displayed) in response to receiving an operation of controlling a target virtual object to search the virtual container.

In a possible implementation, the virtual container is a virtual container existing in the virtual scene. When a target operation on the virtual container is received, a search interface of the virtual container is displayed, and the target operation is an operation of searching the virtual container.

In another possible implementation, the virtual container is a virtual container existing in the virtual scene and on another virtual character. In this case, the user may control the target virtual character to interact with the another virtual character, and display a character interface corresponding to the another virtual character. The character interface includes the search interface of the virtual container.

In a possible implementation, the virtual character may be a virtual character in a surviving state in the virtual scene, and the target virtual character controlled by the user may interact with the virtual character in a surviving state in a targeted manner, to display the search interface corresponding to the virtual container in the character interface corresponding to the virtual character. For example, when a distance between the target virtual character controlled by the user and the virtual character is less than a distance threshold, an operation control corresponding to a "stealing skill" is displayed on the virtual interface of the virtual scene, and in response to receiving a target operation on the operation control for the "stealing skill", the character interface corresponding to the virtual character is displayed. The character interface includes the search interface corresponding to the virtual container.

In a possible implementation, the virtual character may alternatively a virtual character in a death state in the virtual scene, and the target virtual character controlled by the user may interact with the virtual character in a death state in a targeted manner, and directly display the search interface corresponding to the virtual container. For example, after the virtual character is in a death state, a virtual container corresponding to the virtual character is correspondingly generated, and when the target virtual character controlled by the user searches the virtual container, the search interface corresponding to the virtual container is displayed.

In Step 403, storage locations in the virtual container are displayed (or controlled to be displayed) on the search interface in response to a search duration reaching a third duration.

The third duration is less than a first duration. The first duration is a time node corresponding to displaying a prop identifier at a target storage location in the search interface.

The third duration corresponds to the third stage of displaying the search interface, that is, the storage locations in the virtual container are displayed on the search interface at the third stage of displaying the search interface. The third stage is before the first stage. The third stage may alternatively correspond to the stage during which the loading of the storage locations in the virtual container is completed. When an operation of searching the virtual container by the user by controlling the target virtual object through the terminal is received, the storage locations in the virtual container are displayed first on the search interface of the virtual container. In other words, after the user controls the target virtual object to perform the search operation on the virtual container, the volume of the virtual container may be displayed first on the search interface of the virtual container.

In a possible implementation, the search interface of the virtual container includes a search control for triggering searching for the virtual container. FIG. 5 is a schematic diagram of a search interface of a virtual container involved in an embodiment of this disclosure. As shown in FIG. 5, when the user controls the target virtual object through the terminal and interacts with the virtual container, a search interface 500 corresponding to the virtual container is displayed on the virtual scene. The tactical chest rig (that is, a virtual container) shown in FIG. 5 is used as an example. The user controls the target virtual object to perform a target operation on the tactical chest rig in the scene picture of the virtual scene, and unfolds the search interface shown in FIG.

5. A search control 501 is superimposed on the search interface. When the user does not perform a target operation on the search control, that is, when the target virtual object controlled by the user does not search the tactical chest rig, an unsearched identifier is displayed in the search interface, to remind the user that the tactical chest rig has not been searched.

In a possible implementation, when the target operation of the target virtual object on the virtual container is received, a search duration interface is displayed on the search interface of the virtual container.

Figure 6:
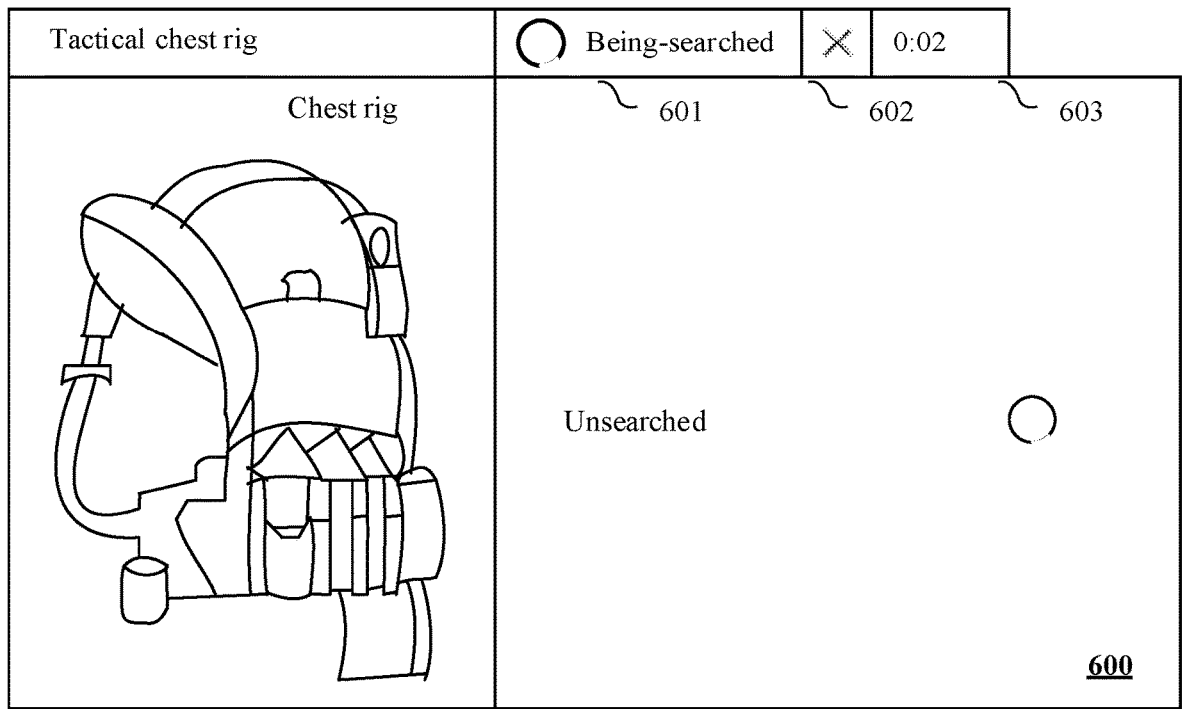
FIG. 6 is a schematic diagram of a search interface of a virtual container involved in an embodiment of this disclosure.

FIG. 6 is a schematic diagram of a search interface of a virtual container involved in an embodiment of this disclosure. As shown in FIG. 6, after the user controls the target virtual object to complete the interaction of the target operation on the tactical chest rig in the virtual scene, the search interface corresponding to the tactical chest rig is displayed, and the target operation is performed on the search control on the search interface. After the search process for the virtual container starts, a being-searched identifier 601 is displayed on the original search control on the search interface 600, and a cancel control 602 may further be displayed on the search interface 600, where the cancel control 602 is configured to stop the search operation on the virtual container after a trigger operation of the user is received. A search duration 603 may further be displayed in the search interface 600, where the search duration 603 is used for displaying a continuous search duration for the virtual container.

In a possible implementation, after receiving the target operation of the target virtual object on the search control 501 in the search interface shown in FIG. 5, that is, after receiving the operation of searching the virtual container, the search duration starts to be timed, and when the search duration reaches the third duration, the storage locations in the virtual container, that is, the volume corresponding to the virtual container, are displayed on the search interface.

Figure 7:
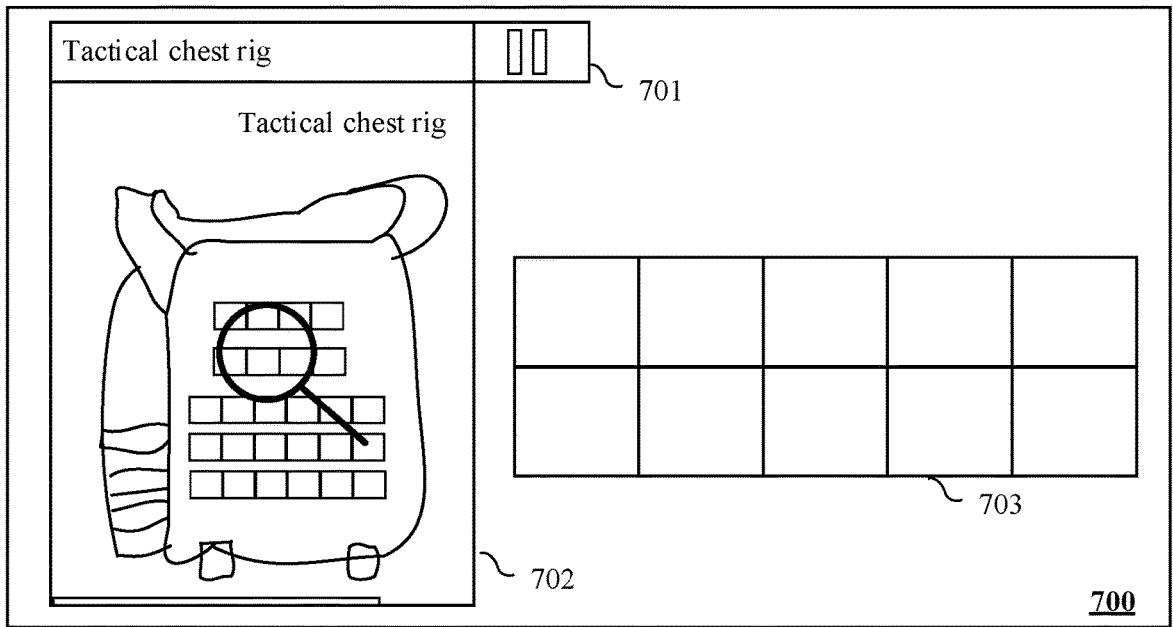
FIG. 7 is a schematic diagram of storage locations in a virtual container involved in an embodiment of this disclosure.

FIG. 7 is a schematic diagram of storage locations in a virtual container involved in an embodiment of this disclosure. As shown in FIG. 7, the tactical chest rig is used as an example. After receiving the operation of searching the virtual container, a pause control 701 is displayed on the search interface 700, where the pause control 701 is configured to pause the search operation on this virtual container when a trigger operation of the user is received. In the search interface 700, a search icon is displayed and superimposed on a virtual container display interface 702 corresponding to the tactical chest rig, to show the user that the virtual container (tactical chest rig) is currently being searched. When the search duration reaches the third duration, the storage locations 703 of the virtual container may be displayed in the search interface 700.

In a possible implementation, information about the storage locations in the virtual container is related to the type of the virtual container. By using the tactical chest rig shown in FIG. 7 as an example, containers of the tactical chest rig type may have a predetermined quantity and positions of storage locations. Accordingly, the terminal displays the appropriate quantity and positions of the storage locations corresponding to the type of virtual container.

In another possible implementation, the information about the storage locations in the virtual container may be delivered by the server to the terminal after receiving the request sent by the terminal, and the information about the storage locations in the virtual container may include quantity information and location information about the storage locations. The terminal displays the storage locations corresponding to information about the storage locations.

In a possible implementation, the information about the storage locations in the virtual container may include information about usable locations and information about unusable locations. The virtual container may display the storage locations corresponding to the virtual container according to the information about usable locations and the information about unusable locations, and display corresponding identifiers on the storage locations corresponding to the information about unusable locations. For example, when there is a storage location corresponding to the information about unusable locations on the tactical chest rig, a "damaged" identifier is displayed on the virtual picture corresponding to the storage location, to remind the user that the storage location is unusable, and the target virtual character corresponding to the user cannot interact with the storage location.

In a possible implementation, the third duration may be determined according to container information of the virtual container. The container information may be at least one of quantity information of the storage locations and basic attribute information of the virtual container. The basic attribute information of the virtual container may be a type attribute of the virtual container, for example, the virtual container being a bullet box, or the virtual container being a tactical chest rig.

In a possible implementation, the basic attribute information of the virtual container may further include encryption information of the virtual container.

For example, compared with the virtual container corresponding to the tactical chest rig, the virtual container corresponding to the bullet box has a simpler internal structure and is more convenient for a virtual character to perform searching, so that a shorter third duration may be set. That is, the target virtual character may spend less time in determining the volume of the bullet box. Because usable storage locations included in the tactical chest rig are relatively scattered, the virtual character shall spend more time in determining the volume of the tactical chest rig, that is, set a longer third duration. For virtual containers of the same type or similar types, the time spent by a virtual character in searching for more usable locations shall also be longer. Alternatively, the virtual container may further include a password part. When the virtual container is searched, the password part needs to be simply deciphered, to determine usable locations inside the password, so that the set third duration may also be longer. The foregoing solution is an exemplary solution for setting the third duration, and the setting manner of the third duration is not limited in this disclosure.

In Step 404, a prop identifier is displayed (or controlled to be displayed) at a target storage location in the search interface of the virtual container in response to the search duration reaching the first duration.

The prop identifier is used for indicating that a virtual prop is stored at the target storage location.

In a possible implementation, after the terminal receives the container data corresponding to the virtual container and receives the search operation on the virtual container triggered by the user, when the search duration reaches the first duration, the prop identifier is displayed at the target storage location on the search interface of the virtual container according to the container data corresponding to the virtual container delivered by the server.

Figure 8:
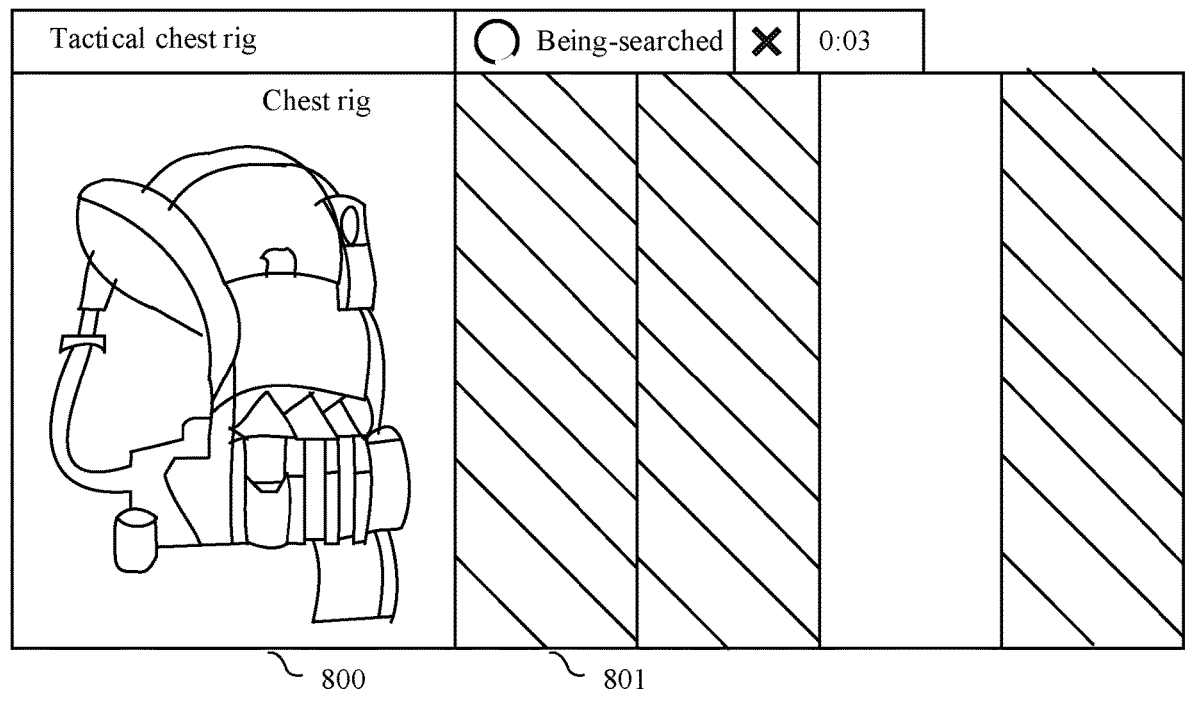
FIG. 8 is a schematic diagram of a prop identifier involved in an embodiment of this disclosure.

FIG. 8 is a schematic diagram of a prop identifier involved in an embodiment of this disclosure. As shown in FIG. 8, the tactical chest rig 800 corresponding to FIG. 8 is used as an example. After the target operation of the target virtual object on the search control corresponding to the virtual container is received, timing of the search duration is started, and when the search duration reaches the third duration, the tactical chest rig may display storage locations corresponding to tactical chest rig. When the search duration reaches the first duration, the tactical chest rig acquires location information of virtual prop storage recorded in the container data according to the corresponding container data, and displays, according to the location information of virtual prop storage, a prop identifier at a storage location at which a virtual prop is stored. The prop identifier in FIG. 8 is a shaded part 801. In other words, when the tactical chest rig is searched, in a case that the search duration reaches the third duration, the storage locations of the tactical chest rig are displayed; and in a case that the search duration reaches the first duration, virtual props being stored at which locations in the storage locations and no virtual prop being stored at which locations in the storage locations are displayed, to simulate a situation of performing rough searching on the container in reality.

In a possible implementation, when there are a plurality of virtual props in the virtual container, in a case that the search duration reaches the first duration, a plurality of prop identifiers are simultaneously displayed corresponding to a plurality of target storage locations in the search interface of the virtual container. In a possible implementation, the first duration is acquires based on a first type attribute in the target type attribute.

In a possible implementation, the target type attribute includes at least one of a quantity of the virtual prop, a weight of the virtual prop, a value of the virtual prop, a size of the virtual prop, and a type of the virtual prop.

The first type attribute includes at least one of the weight of the virtual prop and the size of the virtual prop.

In other words, when there are a plurality of virtual props in the virtual container, in a case that the search duration reaches the first duration, a plurality of prop identifiers are sequentially displayed corresponding to a plurality of target storage locations in the search interface of the virtual container. The display order of the prop identifiers may alternatively be determined by weights and sizes of the virtual props. The first duration corresponding to each virtual prop may be determined according to at least one of the weight of the virtual prop and the size of the virtual prop. When the weight of the virtual prop is larger or the size of the virtual prop is larger, it can be considered that the virtual prop in the virtual container is more easily perceived by a virtual character, and a storage location corresponding to the virtual prop is determined. Therefore, a larger weight of the virtual prop indicates that the first duration can be shorter; or a larger size of the virtual prop indicates that the first duration can be shorter, so that the virtual character can acquire location information corresponding to the virtual prop in the virtual container earlier. In other words, for different virtual props, due to different weights or sizes thereof, when the different virtual props are displayed in the search interface of the virtual container, first durations corresponding to the different virtual props are also different. The interface display may be shown as displaying prop identifiers of heavy virtual props (virtual props with relatively large weights or relatively large sizes) first, and then displaying prop identifiers of light virtual props (virtual props with relatively light weights or relatively small sizes).

In Step 405, contour information of the virtual prop is displayed at the target storage location in response to the search duration reaching a fourth duration.

The fourth duration is greater than the first duration, and the fourth duration is less than the second duration.

The contour information of the virtual prop corresponding to the prop identifier may be displayed at the target storage location with the prop identifier in a case that the search duration reaches the fourth duration.

The fourth duration may correspond to a fourth stage of displaying the search interface. In other words, contour information of the virtual prop is displayed at the target storage location at the fourth stage of displaying the search interface, the fourth stage being between the first stage and the second stage. The fourth stage may alternatively correspond to a stage during which the contour information of the virtual prop is loaded.

Figure 9:
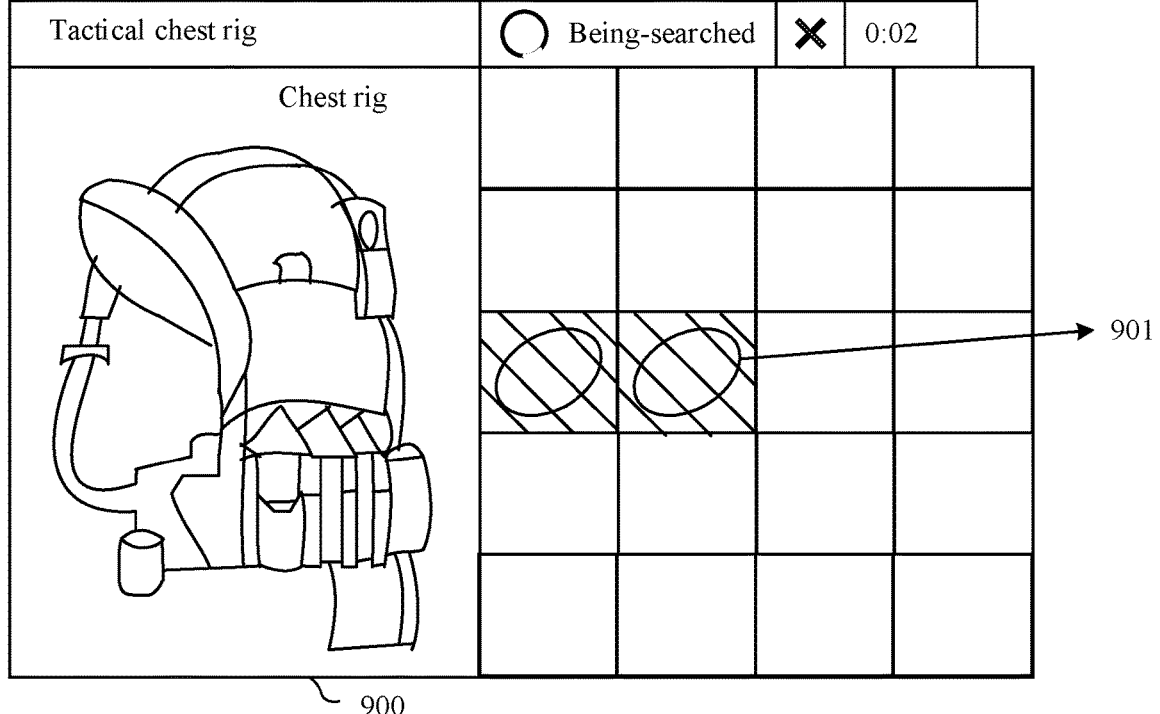
FIG. 9 is a schematic diagram of a search interface of a virtual container involved in an embodiment of this disclosure.

FIG. 9 is a schematic diagram of a search interface of a virtual container involved in an embodiment of this disclosure. As shown in FIG. 9, when the search duration reaches the fourth duration, by using the tactical chest rig 900 as an example, in the search interface of the tactical chest rig shown in FIG. 9, contours and sizes 901 corresponding to corresponding virtual props in the container may be displayed first. The user may roughly determine the types of virtual props existing in the virtual container and the quantities corresponding to various types of virtual props based on the outlines and the sizes 901 corresponding to the virtual props. In addition, first acquiring the sizes and outlines of the virtual props is more in line with the logic of prop searching. That is, when inspecting a virtual prop, the type of the virtual prop and the shape of the virtual prop first need to be determined, and after the determination, the virtual prop being what prop is specifically determined.

In Step 406, the virtual prop is displayed at the target storage location in response to the search duration reaching a second duration.

The second duration is greater than the first duration, and at least one of the first duration and the second duration is determined based on a target type attribute of the virtual prop. In addition, the second duration is greater than the fourth duration.

Figure 10:
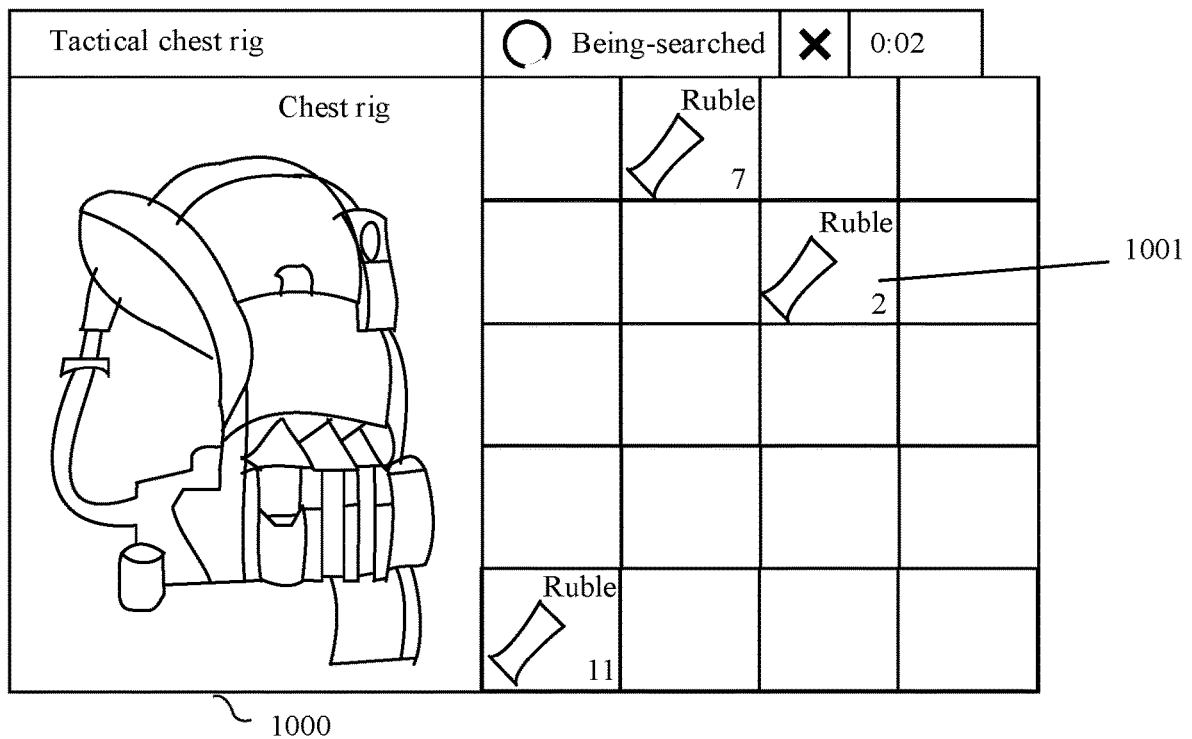
FIG. 10 is a schematic diagram of virtual prop display involved in an embodiment of this disclosure.

FIG. 10 is a schematic diagram of virtual prop display involved in an embodiment of this disclosure. As shown in FIG. 10, an example in which the tactical chest rig 1000 is a virtual container is used. In a case that the search duration reaches the second duration, rubles and a quantity value corresponding to the rubles are displayed at a target storage location 1001 (at which the rubles are located) of the tactical chest rig.

In a possible implementation, the second duration is acquired based on a second type attribute in the target type attribute, the second type attribute including at least one of the quantity of the virtual prop, the value of the virtual prop, and the type of the virtual prop.

In a possible implementation, when the search duration reaches the second duration, the virtual prop is displayed at the target storage location, and the virtual prop is set to a usable state.

When the search duration reaches the second duration, the virtual prop is displayed at the target storage location. In other words, in this case, the virtual character has searched for and identified the virtual prop, and at this time the virtual character can perform a certain operation on the virtual prop.

The second duration may be determined according to the second type attribute, that is, at least one of the quantity of the virtual prop, the value of the virtual prop, and the type of the virtual prop.

For example, when the quantity of the virtual prop is larger, it can be considered that longer time is spent by a virtual character in identifying the exact quantity, so that a corresponding second duration thereof is longer; when the value of the virtual prop is higher, it can be considered that the virtual character will give priority to the virtual prop, so that the virtual character can identify specific attributes of the virtual prop more quickly, and a corresponding second duration thereof is shorter; and when the type of the virtual prop is an uncommon type, the degree of rarity of the virtual prop is relatively high, and it can be considered that it is more difficult for the virtual character to identify the specific attributes of the virtual prop, so that a corresponding second duration thereof is longer. The foregoing method for setting the second duration is an exemplary description, and the developer may alternatively set other rules for the second duration, which is not limited in this disclosure.

In a possible implementation, at least one of the first duration and the second duration is determined based on a target type attribute of the virtual prop.

That is, the first duration may be determined according to the target type attribute of the virtual prop, or the second duration may be determined according to the target type attribute of the virtual prop, or the first duration and the second duration may be determined simultaneously according to the target type attribute of the virtual prop. That is, the time spent by a user in searching for a virtual prop is related to a target type attribute of the virtual prop.

In a possible implementation, the process of displaying the virtual prop at the target storage location may be implemented as follows: acquiring respective target parameter values of the virtual props at the at least two storage locations; sorting the at least two storage locations according to the respective target parameter values; and sequentially displaying the virtual props at the at least two storage locations according to a sorting result.

In a possible implementation, the target parameter value includes at least one of a size of the corresponding virtual prop and a value of the corresponding virtual prop.

When the user controls the target virtual character through the terminal to search for the virtual props in the virtual container, a display order of the virtual props in the search process is determined according to the target parameter values in the virtual props in the virtual container.

In a possible implementation, when a target operation of the user on the search control of the search interface is received, the target parameter values corresponding to the virtual props in the virtual container delivered by the server are acquired; and a display order of the virtual props in the search process is determined according to the target parameter values.

In a possible implementation, the target parameter value may be a preset value. For example, a higher target parameter value may be set for firearm materials, and a lower target parameter value may be set for medicines. In this case, when the virtual container is searched, specific information of virtual props of the firearm material type is displayed first, and then specific information of virtual props of the medicine type is displayed.

In a possible implementation, the target parameter value may be set by the user. That is, the user may set a search requirement of a certain type of virtual materials to a currently required material. In this case, when the virtual container is searched, the target parameter value corresponding to the type of materials may be considered to be the highest. In this case, specific information of this type of virtual props is displayed first, so as to improve the search efficiency corresponding to the material required by user.

In a possible implementation, the display order of the virtual props in the search process may be preset. For example, the display order of the virtual props may be set to being sequentially displayed from top to bottom and from left to right.

In a possible implementation, at least one of the first duration and the second duration is acquired based on the target type attribute and additional information, the additional information including at least one of scene information of the virtual scene and state information of the target virtual object.

In a possible implementation, at least one of the first duration and the second duration may be determined based on the target type attribute and the additional information. That is, the first duration and the second duration may also be determined according to the additional information based on the target type attribute corresponding to the virtual prop.

In a possible implementation, the scene information includes at least one of time information of the virtual scene and a quantity of virtual objects in the virtual scene.

For example, the scene information may be 22:00 at night. In this case, the time information in the virtual scene is obviously late night, and it can be considered that the light intensity in the virtual scene is relatively weak, so that the corresponding first duration and second duration are relatively long. In another example, when the quantity of virtual objects in the virtual scene is relatively large, that is, when there are a relatively large quantity of enemies, it can be considered that the target virtual character controlled by the user is more likely to be in a tense state, and its search efficiency may decrease at this time. Therefore, the corresponding first duration and second duration are also relatively long.

In a possible implementation, the scene information may further include at least one item of light intensity and humidity of the virtual scene.

For example, when the light intensity is relatively weak, the first duration and the second duration may be set to relatively large values; when the humidity is relatively high, it can be considered that an operation of the virtual character in the virtual scene on the virtual container is more susceptible to interferences. In this case, the first duration and the second duration may be set to relatively large values.

In a possible implementation, the state information includes at least one of a health condition of the target virtual object, a buffed state of the target virtual object, a debuffed state of the target virtual object, and a level of the target virtual object.

In a possible implementation, the health condition may be hit point data corresponding to the target virtual object. When the health value data is relatively low, it indicates that the target virtual object may be in a weak state, so its search speed shall decrease, and the corresponding first duration and second duration are relatively long. The debuffed state of the target virtual object may be a state such as dizziness, fracture, or blood loss, and the search speed of the target virtual object shall also decrease, so that the corresponding first duration and second duration are relatively long. The buffed state of the target virtual object may be a state such as being excited or being focused, and in this case, the target virtual object is in a relatively good virtual state, and its search efficiency is improved, so that the corresponding first duration and second duration shall be relatively short.

In a possible implementation, the level of the target virtual object may include at least one of a character level of the target virtual object or a skill level of the target virtual object.

A search efficiency value of the target virtual object may be determined according to at least one of the character level of the target virtual object and the skill level of the target virtual object, and the corresponding first duration and second duration are set according to the search efficiency value.

In addition, in a possible implementation of this embodiment of this disclosure, the third duration and the fourth duration may also be determined in the foregoing manner based on the same consideration, and details are not described herein again.

In a possible implementation, inspection state information corresponding to the virtual prop is acquired, the inspection state information being used for indicating whether the virtual prop has been inspected by the target virtual object; and the virtual prop is displayed at the target storage location in a case that the search duration reaches the second duration and the inspection state information corresponding to the virtual prop indicates that the virtual prop has been inspected by the target virtual object.

In a possible implementation, the terminal includes an item identifier table, and the item identifier table is used for indicating props that can be identified by the target virtual character. When a virtual prop in the virtual container is searched for, an inspection state corresponding to the virtual prop is acquired according to an identifier corresponding to the virtual prop and the item identifier table.

When the virtual prop has been inspected, it can be considered that the target virtual object knows the virtual prop, so that the virtual prop can be directly displayed. When the virtual prop has not been inspected, it can be considered that the target virtual object does not know the virtual prop, and in this case, only the contour of the virtual prop is displayed.

Figure 11:
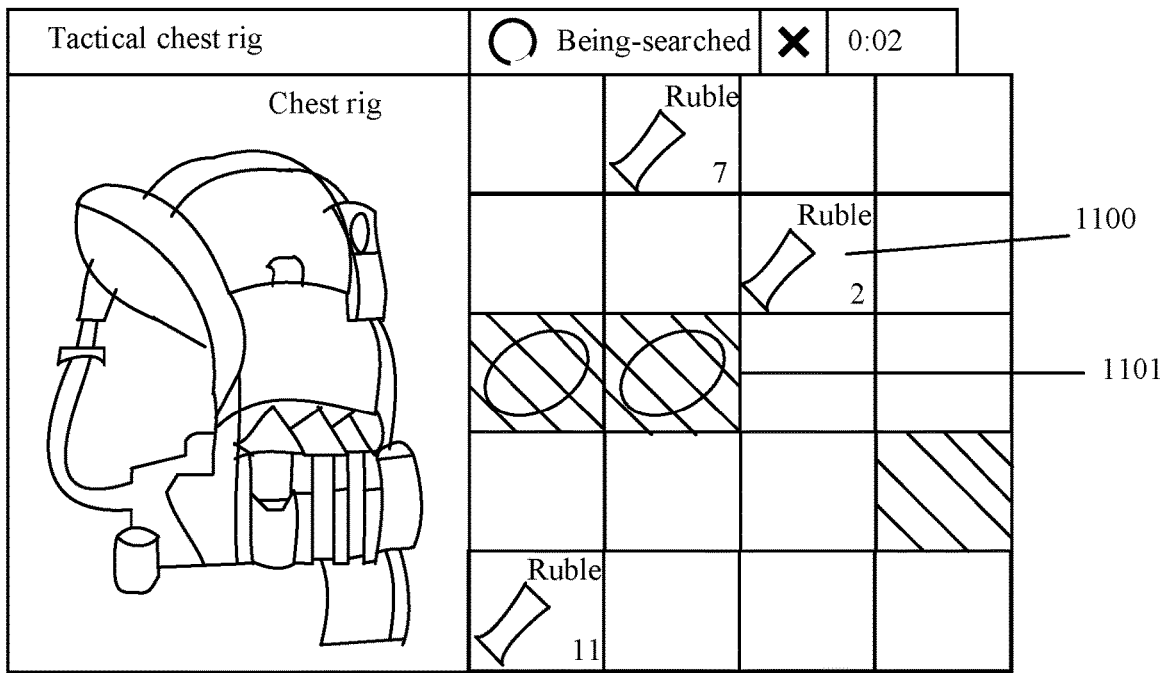
FIG. 11 is a schematic diagram of uninspected virtual props involved in an embodiment of this disclosure.

FIG. 11 is a schematic diagram of uninspected virtual props involved in an embodiment of this disclosure. As shown in FIG. 11, for inspected props, images and the quantity thereof can be normally displayed, for example, rubles 1100 in FIG. 11; and for an uninspected item 1101, only contour information thereof can be displayed on the search interface.

In a possible implementation, the target virtual object performs an inspection operation on the uninspected virtual prop, and displays the virtual prop at a position corresponding to a contour of the virtual prop in response to the inspection operation.

After the user performs an inspection operation on the uninspected virtual prop, the user can identify type information of the virtual prop, and the virtual prop can be normally displayed on the search interface at this time.

In reality, if an item needs to be found in an unfamiliar environment, the decisions and behaviors from common sense are shown in Table 1. In reality, the usual logical steps are: what am I looking for; where it may be placed; find the container; inspect the container; identify each item in the container; find what I'm looking for; take away. Therefore, in the virtual scene, the logical steps are accordingly: target material; anchoring cognition of containers and materials;

find a target container; identify a size and a storage condition of the container; sequentially identify each item; operate the item.

TABLE 1

| Decision order | Reality | Virtual scene |
|---|---|---|
| 1 | What am I looking for | Target material |
| 2 | Where it may be placed | Anchoring cognition of containers and materials |
| 3 | Find the container | Find a target container |
| 4 | Inspect the container | Identify a size and a storage condition of the container |
| 5 | Identify each item in the container | Sequentially identify each item |
| 6 | Find what I'm looking for | |
| 7 | Take away | Operate the item |

Figure 12:
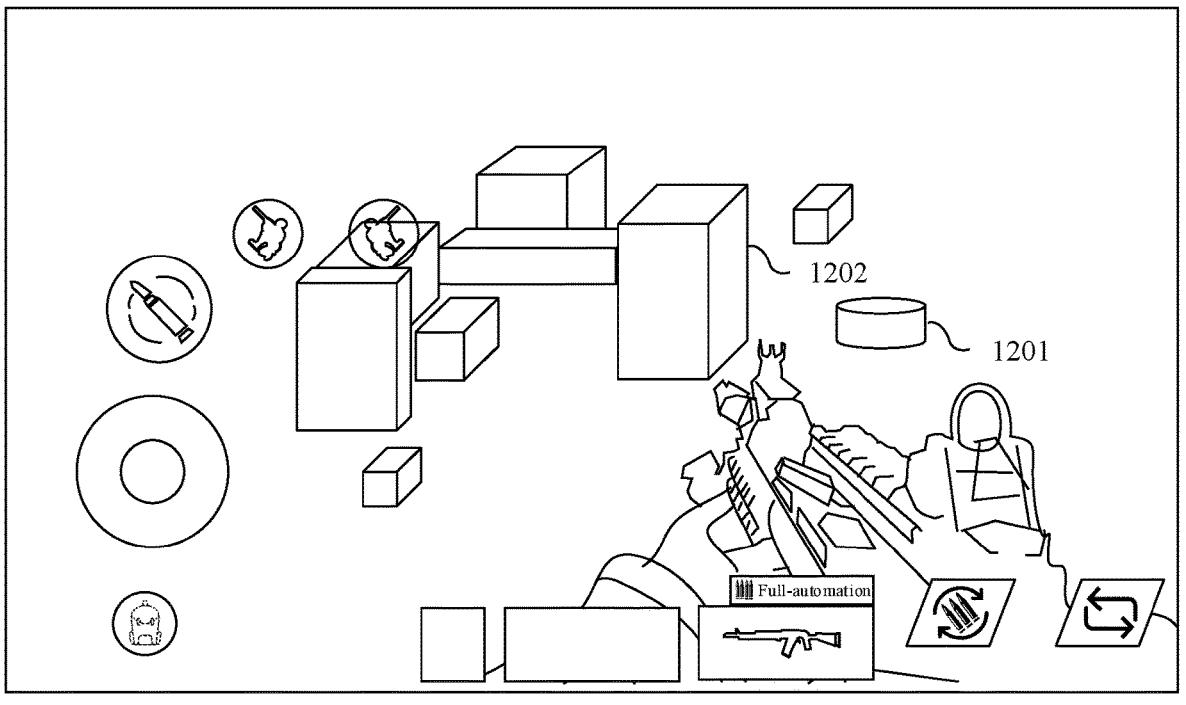
FIG. 12 is a schematic diagram of virtual scene picture involved in an embodiment of this disclosure.

In a mobile end shooting game, most materials are generated anywhere. Refresh locations of these materials are mostly decoupled from the scene functions in the game. For example, "the bullets are not stored in the bullet box", and "drugs are scattered everywhere". Players lack an immersed sense in different regions of the game scene. FIG. 12 is a schematic diagram of virtual scene picture involved in an embodiment of this disclosure. As shown in FIG. 12, virtual containers in the virtual scene picture, such as a sports bag 1201 and a first aid kit 1202 are shown. Most of the virtual props are stored in suitable virtual containers according to common sense, so as to facilitate players' perception of the types of virtual props. To further facilitate the players to identify such type of special virtual containers for storing materials in the scene, a display state of these virtual containers is set to self-illumination. Table 2 shows a placement relationship between virtual materials and virtual containers. As shown in Table 2, a logical placement relationship between materials and virtual containers is shown. For example, a wooden weapon box has weapons and accessories; a computer host has electronic parts; and a safe box stores valuable items.

TABLE 2

| No. | Container | Storage content |
|---|---|---|
| 1 | Wooden weapon box | Weapons and accessories |
| 2 | Black weapon box | Advanced weapons |
| 3 | Computer host | Electronic parts |
| 4 | Tool machine | Sundries |
| 5 | Grenade box | Missiles |
| 6 | Cash register | Money |
| 7 | Safe box | Valuable items |
| 8 | Bullet box | Bullets |
| 9 | Drawer | Small sundries |
| 10 | First aid kit | Medicines |
| 11 | Sports bag | Sundries |
| 12 | Medical kit | Medicines |
| 13 | Clothes | Sundries, keys, and the like |

A method for searching for a virtual prop in the virtual scene may be implemented through the following steps.

In step 1, the capacity of a target container is identified. At the beginning, a player can see a tactical chest rig (virtual container) in the scene. Without searching this tactical chest rig, it is impossible to know how big the bag is, what is in it, and what each thing is. In this case, the player may search the tactical chest rig through an interaction interface. After a period of time (there is a difference between different virtual containers, and there is a difference between different player states), the capacity of this virtual container is displayed.

In step 2, how many items are stored in the container is known. As the search progresses, the player automatically "identifies" the rough situation of items stored in the virtual container, such as locations at which the items are placed, and approximate sizes of the items.

In step 3, each item stored in the container is identified and an operation is performed. That is, the player can further perform an operation after "recognizing" what is in the container.

Figure 13:
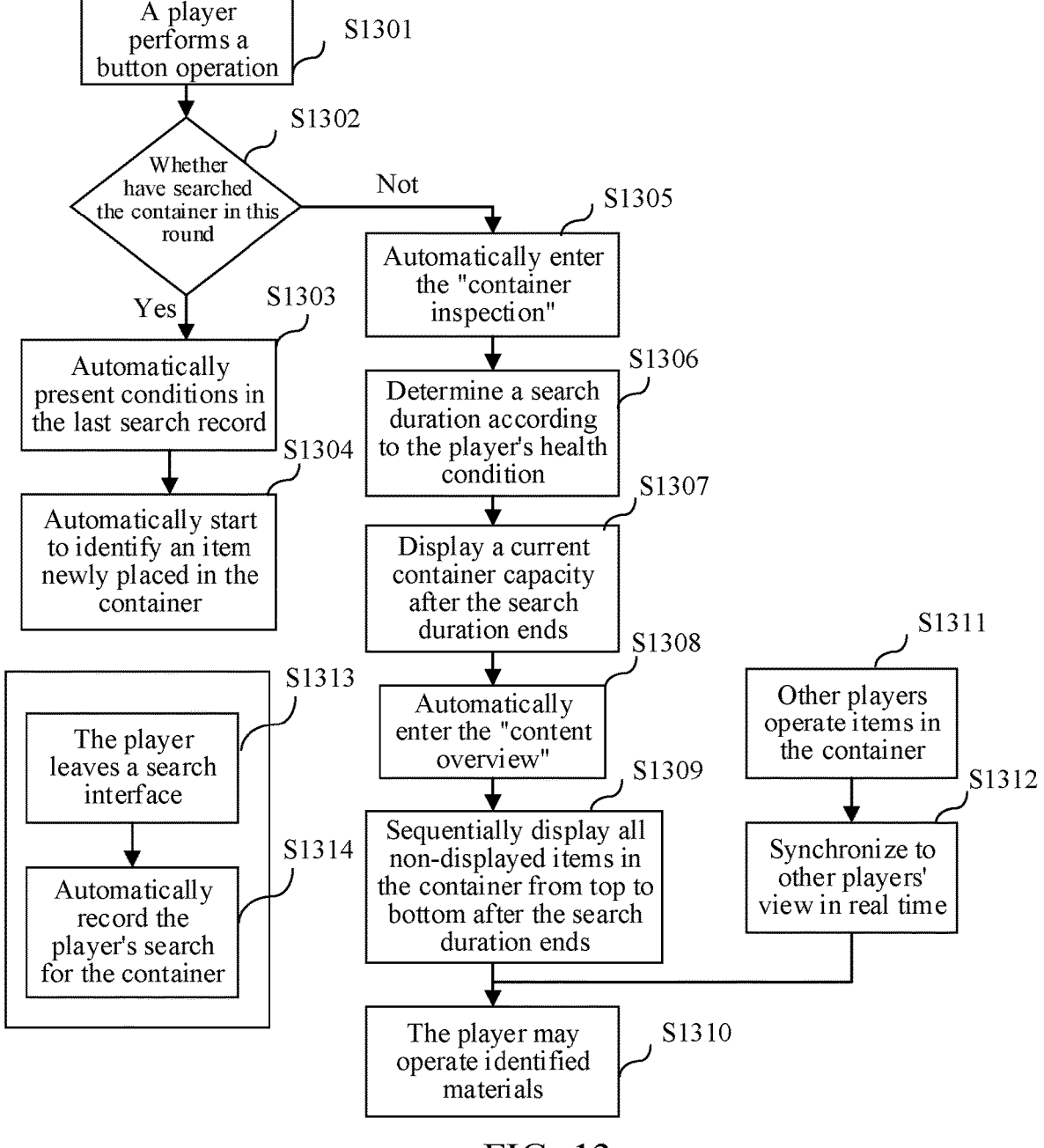
FIG. 13 is a flowchart of displaying a virtual prop involved in an embodiment of this disclosure.

FIG. 13 is a flowchart of displaying a virtual prop involved in an embodiment of this disclosure. As shown in FIG. 13, In S1301, a player presses a button to interact with a container. In S1302, a search state record of the player for the container is acquired. In S1303, if the player has searched the container before, the information that the player has searched the container is displayed according to the record without counting seconds. In S1304, it is identified whether there is a newly placed item in the container (which simulates that "the player has already seen and searched this container" in reality). In S1305, if the player has not searched this container before, a search button or an unsearched region is clicked to perform a search operation and trigger a timer, where a search identifier 601, a cancel control 602, and a search duration 603 shown in FIG. 6 are displayed, and in this case, a container inspection state is automatically entered. In S1306, a search duration is determined according to the player's health condition. In S1307, a current container capacity is displayed after the search duration ends. In S1308, the "content overview" is automatically entered. That is, virtual objects included in the virtual container are identified. In S1309, all non-displayed items in the container are sequentially displayed from top to bottom after the search duration ends. In S1310, the player may operate identified materials. In S1311, operations of other players on items in the container are acquired. In S1312, an operation record of the player is synchronized to other players' view in real time. In S1313, the player leaves a search interface by using an exit control in the search interface. In S1314, the player's search for the container is automatically recorded, the record is saved to a terminal, and the record is synchronized to a server.

That is, after the container is searched for a certain period of time, the size of a container grid is displayed (simulating consumed time to identify the size of the container). In the search process, the search operation may be interrupted through a touch operation on the cancel control at any time, a search record obtained before the search operation is interrupted is stored on the terminal, and the search record is uploaded and synchronized to the server.

Figure 14:
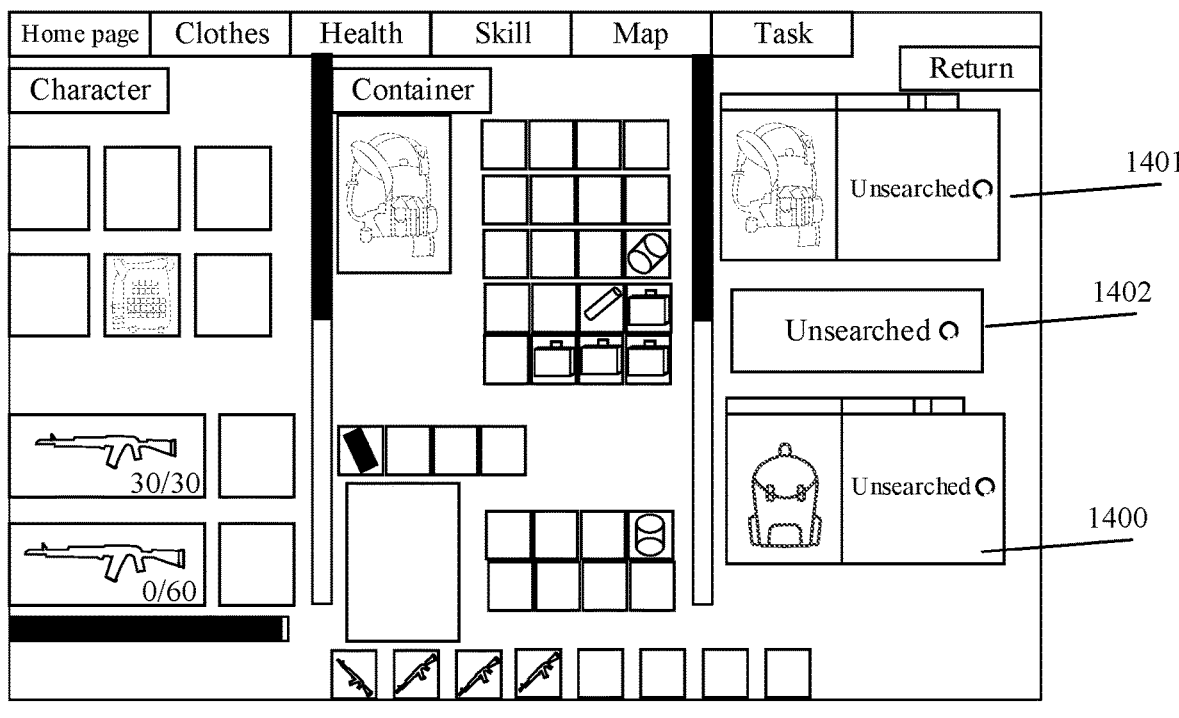
FIG. 14 is a schematic diagram of a search interface corresponding to a container of a dead character involved in an embodiment of this disclosure.

FIG. 14 is a schematic diagram of a search interface corresponding to a container of a dead character involved in an embodiment of this disclosure. As shown in FIG. 14, 1400 is a search interface displayed in the search for a virtual container (tactical backpack) of a virtual character in a death state; 1401 is a search interface displayed in the search for a virtual container (tactical chest rig) of the character in a death state; and 1402 is a search interface for which the virtual container of the character in a death state is not searched. When the search duration reaches the first duration, the grid in the virtual container is displayed, and then when the search duration reaches the second duration, each item in a non-searched state is sequentially changed into an item in a searched state one by one according to the order of the grids from left to right and from top to bottom, and the display manner is changed. The player may perform operations such as picking up/inspection/discarding on any single item in an item searched state during the search, and synchronize it to other players' item view in real time. The time elapsed by each item before being changed into a searched state is affected by the following factors: a health condition (left hand, right hand, and the like), a debuffed state (such as dizziness), in-round time, a character skill level, an item quantity/weight/value, and the like. The item quantity/weight/value may be used as reference time, and other factors may be used as auxiliary factors, to jointly determine whether to change the item from the non-searched state into the searched state and the length of time (second duration) before it is changed to the searched state.

In the earliest shooting game, props used by players in the round are mainly weapons, that is, the players use weapon equipment that they brought in to compete according to their own strategies and preferences. Subsequently, as the vertical subdivision of categories became more complex, what the players used in the ground is not limited to equipment, but expanded to "materials that can facilitate victory", such as car fuel that increases mobile efficiency. However, players usually pick up these materials directly on the ground in the game. On the one hand, the setting of guns everywhere has relatively low rationality and a poor immersed sense; on the other hand, the players lack enough depth of prop strategies. However, by using the solution described in this embodiment of this disclosure, when the players choose to pick up/carry materials, values of the items other than the combat are more considered. It is easier for players to understand storage locations of different types of materials, so that players are guided to different functional regions in levels more purposefully. A player will inspect the materials in the virtual container in the scene before a further operation, and the player's search efficiency for the virtual container is affected by the player's state, the material situation in the virtual container, and even other players. Therefore, the rationality of the game and the player's sense of tension in the process are improved, and the player's sense of presence and the strategy brought about by the acquisition of resources in the game are increased.

Based on the above, in the solution shown in this embodiment of this disclosure, at least one of a first duration and a second duration is determined based on a target type attribute of a virtual prop in a virtual container; when a virtual character needs to acquire the virtual prop in the virtual container, a search interface is first displayed; when a search duration reaches the first duration, a prop identifier is displayed at a storage location corresponding to the virtual prop in the search interface; and when the search duration reaches the second duration, the virtual prop is then displayed in the search interface. By using the foregoing solution, a terminal can determine the first duration and the second duration according to a target type attribute of the virtual prop, and gradually display relevant information of the virtual prop according to the two durations, thereby lowering a load on terminal performance for displaying a virtual prop image, reducing a possibility of display freezing of a virtual scene picture, and improving the display effect of the virtual prop.

Figures 15, 16:
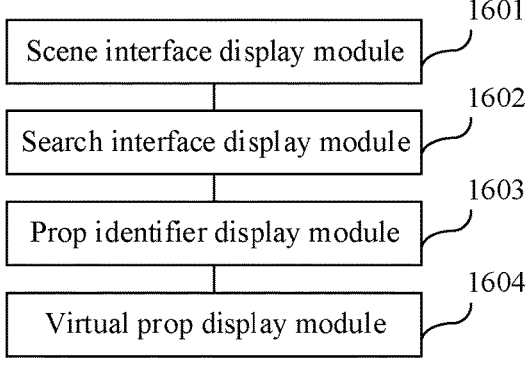
FIG. 15 is a schematic framework diagram of a virtual prop display method according to an exemplary embodiment of this disclosure.
FIG. 16 is a structural block diagram of a virtual prop display apparatus according to an exemplary embodiment.

FIG. 15 is a schematic framework diagram of a virtual prop display method according to an exemplary embodiment of this disclosure. As shown in FIG. 15:

In S1501, a search interface corresponding to a virtual container includes a search control, and in response to a target operation of a user on the search control, a search process starts to be displayed on the search interface corresponding to the virtual container, and search for the virtual container starts to be implemented. When a search duration reaches a third duration, storage locations corresponding to the virtual container are displayed on the search interface.

In S1502, search of the virtual container is continued when the virtual container continues to be in the search state, and the search state is not interrupted or canceled by the user through the target operation. When the search duration reaches a first duration, a prop identifier (the identifier may be a shaded part) is displayed on the search interface corresponding to the virtual container, and the prop identifier is used for indicating that a virtual prop is stored at the target storage location.

In S1503, contour information is displayed (which is replaced with a black ellipse in the figure) corresponding to the virtual prop on the search interface according to a location corresponding to the prop identifier when the virtual container is in a searched state and the search duration reaches a fourth duration.

In S1504, the virtual prop is displayed at the target storage location corresponding to the virtual prop according to information corresponding to the virtual prop when the virtual container continues to be in the searched state and the search duration reaches a second duration, where the virtual prop is in an operable state. In this case, it indicates that the search process for the virtual prop has been completed, and the user can control the target virtual character to perform an interaction operation with the virtual prop.

FIG. 16 is a structural block diagram of a virtual prop display apparatus according to an exemplary embodiment. The virtual prop display apparatus may implement all or some of the steps in the method provided in the embodiment shown in FIG. 3 or FIG. 4. The virtual prop display apparatus includes: a scene interface display module 1601, configured to display a scene interface of a virtual scene, the virtual scene including a virtual container; a search interface display module 1602, configured to display a search interface of the virtual container in a case that an operation of controlling a target virtual object to search the virtual container is received; a prop identifier display module 1603, configured to display a prop identifier at a target storage location in the search interface of the virtual container at a first stage of displaying the search interface, the prop identifier being used for indicating that a virtual prop is stored at the target storage location; and a virtual prop display module 1604, configured to display the virtual prop at the target storage location at a second stage of displaying the search interface.

In a possible implementation, the prop identifier display module is configured to display the prop identifier at the target storage location in the search interface in a case that a search duration reaches a first duration; and the virtual prop display module is configured to display the virtual prop at the target storage location in a case that the search duration reaches a second duration, the second duration being greater than the first duration, and at least one of the first duration and the second duration being determined based on a target type attribute of the virtual prop.

In a possible implementation, the target type attribute includes: at least one of a quantity of the virtual prop, a weight of the virtual prop, a value of the virtual prop, a size of the virtual prop, and a type of the virtual prop.

In a possible implementation, the apparatus further includes: a first duration acquisition module, configured to acquire the first duration based on a first type attribute in the target type attribute, the first type attribute including at least one of the weight of the virtual prop and the size of the virtual prop.

In a possible implementation, the apparatus further includes: a second duration acquisition module, configured to acquire the second duration based on a second type attribute in the target type attribute, the second type attribute including at least one of the quantity of the virtual prop, the value of the virtual prop, and the type of the virtual prop.

In a possible implementation, the apparatus further includes: a duration acquisition module, configured to acquire at least one of the first duration and the second duration based on the target type attribute and additional information, the additional information including at least one of scene information of the virtual scene and state information of the target virtual object.

In a possible implementation, the scene information includes: at least one of time information of the virtual scene and a quantity of virtual objects in the virtual scene.

In a possible implementation, the state information includes: at least one of a health condition of the target virtual object, a buffed state of the target virtual object, a debuffed state of the target virtual object, and a level of the target virtual object.

In a possible implementation, the apparatus further includes: a storage location display module, configured to display storage locations in the virtual container on the search interface at a third stage of displaying the search interface, the third stage being before the first stage.

In a possible implementation, the storage location display module is configured to display the storage locations in the virtual container on the search interface in a case that a search duration reaches a third duration, the third duration being less than a first duration.

In a possible implementation, the apparatus further includes: a contour information display module, configured to display contour information of the virtual prop at the target storage location at a fourth stage of displaying the search interface, the fourth stage being between the first stage and the second stage.

In a possible implementation, the contour information display module is configured to display the contour information of the virtual prop at the target storage location in a case that a search duration reaches a fourth duration, the fourth duration being greater than a first duration, and the fourth duration being less than a second duration.

In a possible implementation, the target storage location includes at least two storage locations, and the virtual prop display module 1604 includes: a target parameter acquisition unit, configured to acquire respective target parameter values of the virtual props at the at least two storage locations; a location sorting unit, configured to sort the at least two storage locations according to the respective target parameter values; and a first virtual prop display unit, configured to sequentially display the virtual props at the at least two storage locations according to a sorting result.

In a possible implementation, the target parameter value includes at least one of a size of the corresponding virtual prop and a value of the corresponding virtual prop.

In a possible implementation, the virtual prop display module 1604 includes: an inspection state acquisition unit, configured to acquire inspection state information corresponding to the virtual prop, the inspection state information being used for indicating whether the virtual prop has been inspected by the target virtual object; and a second virtual prop display unit, configured to display the virtual prop at the target storage location in a case that the search duration reaches the second duration and the inspection state information corresponding to the virtual prop indicates that the virtual prop has been inspected by the target virtual object.

Based on the above, in the solution shown in this embodiment of this disclosure, at least one of a first duration and a second duration is determined based on a target type attribute of a virtual prop in a virtual container; when a virtual character needs to acquire the virtual prop in the virtual container, a search interface is first displayed; when a search duration reaches the first duration, a prop identifier is displayed at a storage location corresponding to the virtual prop in the search interface; and when the search duration reaches the second duration, the virtual prop is then displayed in the search interface. By using the foregoing solution, a terminal can determine the first duration and the second duration according to a target type attribute of the virtual prop, and gradually display relevant information of the virtual prop according to the two durations, thereby lowering a load on terminal performance for displaying a virtual prop image, reducing a possibility of display freezing of a virtual scene picture, and improving the display effect of the virtual prop.

Figure 17:
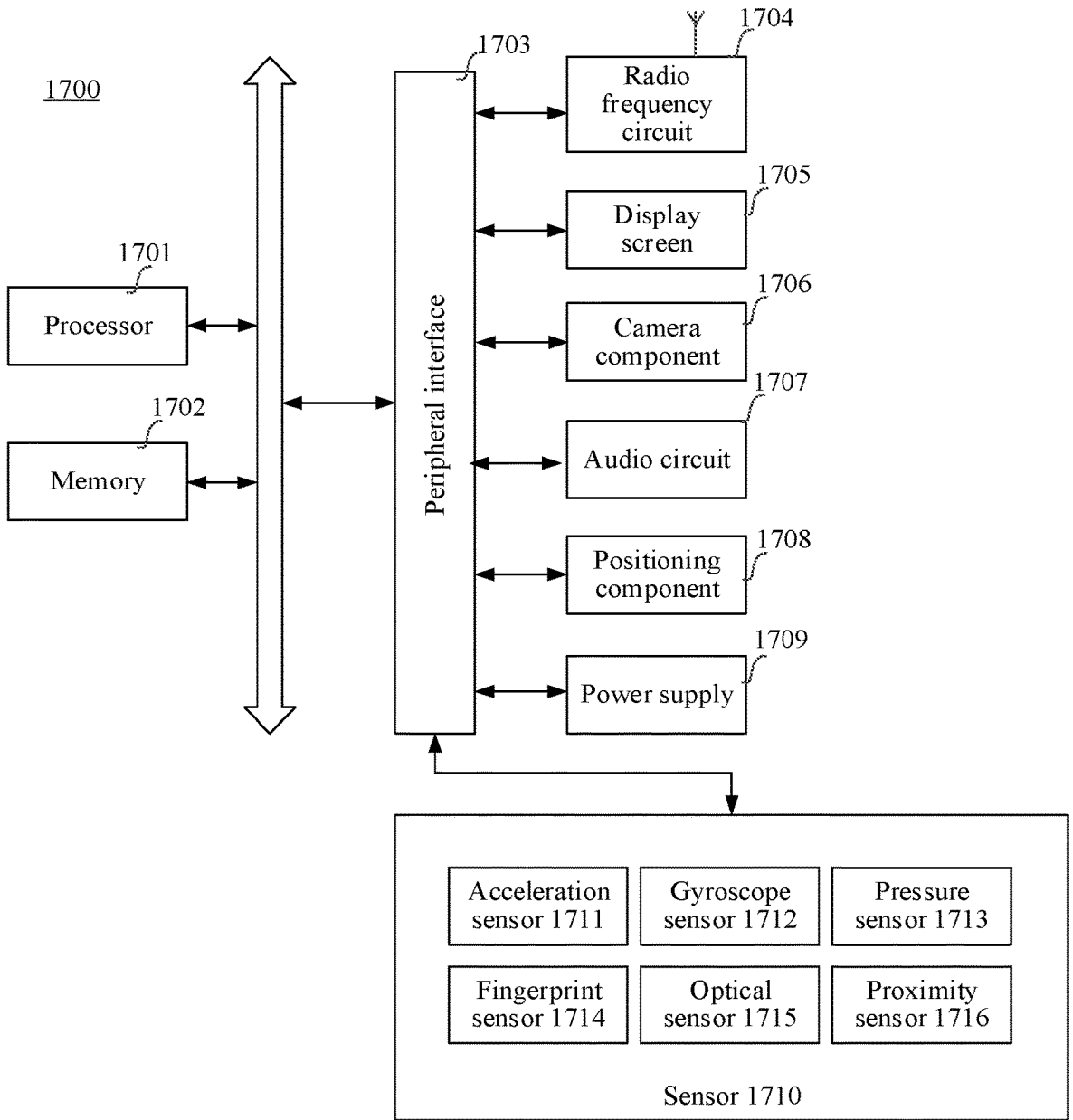
FIG. 17 is a structural block diagram of a computer device according to an exemplary embodiment.

FIG. 17 is a structural block diagram of a computer device 1700 according to an exemplary embodiment. The computer device 1700 may be a terminal, such as a smartphone, a tablet computer, a Moving Picture Experts Group Audio Layer III (MP3) player, a Moving Picture Experts Group Audio Layer IV (MP4) player, a notebook computer, or a desktop computer. The computer device 1700 may also be referred to as another name such as user equipment, a portable terminal, a laptop terminal, or a desktop terminal.

Generally, the computer device 1700 includes a processor 1701 (including processing circuitry) and a memory 1702 (including a non-transitory computer-readable storage medium).

The processor 1701 may include one or more processing cores, for example, a 4-core processor or an 8-core processor. The processor 1701 may be implemented by using at least one hardware form of digital signal processing (DSP), a field-programmable gate array (FPGA), and a programmable logic array (PLA). The processor 1701 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1701 may be integrated with a graphics processing unit (GPU). The GPU is configured to be responsible for rendering and drawing content that a display screen needs to display. In some embodiments, the processor 1701 may further include an artificial intelligence (AI) processor. The AI processor is configured to process a computing operation related to machine learning.

The memory 1702 may include one or more computer-readable storage media. The computer-readable storage media may be non-transient. The memory 1702 may further include a high-speed random access memory (RAM), and a non-volatile memory such as one or more magnetic disk storage devices and a flash storage device. In some embodiments, the non-transitory computer-readable storage medium in the memory 1702 is configured to store at least one instruction, the at least one instruction being configured to be executed by the processor 1701 to implement the virtual prop display method provided in the method embodiments of this disclosure.

In some embodiments, the computer device 1700 further includes a peripheral interface 1703 and at least one peripheral. The processor 1701, the memory 1702, and the peripheral interface 1703 may be connected by a bus or a signal cable. Each peripheral may be connected to the peripheral interface 1703 by a bus, a signal cable, or a circuit board. Specifically, the peripheral includes: at least one of a radio frequency (RF) circuit 1704, a display screen 1705, a camera component 1706, an audio circuit 1707, a positioning component 1708, and a power supply 1709.

In some embodiments, the computer device 1700 further includes one or more sensors 1710. The one or more sensors 1710 include, but not limited to, an acceleration sensor 1711, a gyroscope sensor 1712, a pressure sensor 1713, a fingerprint sensor 1714, an optical sensor 1715, and a proximity sensor 1716.

A person skilled in the art may understand that the structure shown in FIG. 17 does not constitute any limitation on the computer device 1700, and the computer device may include more or fewer components than those shown in the figure, or some components may be combined, or a different component deployment may be used.

In an exemplary embodiment, a non-temporary computer-readable storage medium including instructions, for example, a memory including a computer program (instructions), is further provided, and the program (the instructions) may be executed by a processor of a computer device to complete the methods shown in the embodiments of this disclosure. For example, the non-temporary computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method shown in the foregoing embodiments.

After considering the specification and practicing the present disclosure, a person skilled in the art may conceive of other implementations of this disclosure. This disclosure is intended to cover any variations, uses or adaptation of this disclosure following the general principles of this disclosure and including common knowledge or conventional technical means in the art that are not disclosed in this disclosure. The specification and the embodiments are merely considered as examples, and the actual scope and the spirit of this disclosure are stated in the claims.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A virtual prop display method comprising:

displaying, by processing circuitry, a scene interface of a virtual scene in a virtual environment, the virtual scene comprising a virtual container;

receiving a user operation to control a virtual object in the virtual environment to search the virtual container in the virtual scene;

in response to the user operation to control the virtual object to search the virtual container, displaying, by the processing circuitry, a search interface of the virtual container;

in response to a search duration of the search of the virtual container by the virtual object reaching a first duration that is acquired based on a first value of a specified type of attribute associated with a first virtual prop in the virtual container, displaying, in the search interface, a first graphical representation of the first virtual prop at a first storage location in the virtual container, the first graphical representation indicating that the first virtual prop is stored at the first storage location; and in response to the search duration of the search of the virtual container by the virtual object reaching a second duration that is acquired based on a second value of the specified type of attribute associated with the second virtual prop in the virtual container, displaying, in the search interface, a second graphical representation of the second virtual prop at a second storage location that is different from the first storage location, the second graphical representation indicating that the second virtual prop is stored at the second storage location and being different from the first graphical representation.

2. The method according to claim 1, wherein the second duration is different from the first duration, the first duration varies based on the first value of the specified type of attribute associated with the first virtual prop in the virtual container, and the second duration varies based on the second value of the specified type of attribute associated with the second virtual prop in the virtual container.

3. The method according to claim 1, wherein the specified type of attribute comprises:

a quantity of the respective virtual prop, a weight of the respective virtual prop, a value of the respective virtual prop, a size of the respective virtual prop, or a type of the respective virtual prop.

4. The method according to claim 3, wherein the specified type of attribute includes the weight or the size of the respective virtual prop.

5. The method according to claim 3, wherein the first graphical representation of the first virtual prop includes both an image and a quantity value of the first virtual prop; and the second graphical representation of the second virtual prop includes both an image and a quantity value of the second virtual prop.

6. The method according to claim 2, wherein the method further comprises:

acquiring at least one of the first duration or the second duration based on additional information, the additional information comprising at least one of scene information of the virtual scene or state information of the virtual object.

7. The method according to claim 6, wherein the additional information includes the scene information, which comprises:

at least one of time information of the virtual scene or a quantity of virtual objects in the virtual scene.

8. The method according to claim 6, wherein the additional information includes the state information, which comprises:

at least one of a health condition of the virtual object, a buffed state of the virtual object, a debuffed state of the virtual object, or a level of the virtual object.

9. The method according to claim 1, further comprising:

displaying third graphical representations of storage locations in the virtual container in the search interface based on a third duration of the search of the virtual container by the virtual object, the third duration being less than the first duration and the second duration, the third graphical representations being different from the first graphical representation and the second graphical representation.

10. The method according to claim 9, wherein the displaying the third graphical representations of the storage locations comprises:

in response to the search duration of the search of the virtual container by the virtual object reaching the third duration, displaying the third graphical representations of the storage locations in the virtual container in the search interface.

11. The method according to claim 1, wherein the method further comprises:

displaying a fourth graphical representation of contour information of the first virtual prop at the first storage location based on a fourth duration of the search of the virtual container by the virtual object, the fourth duration being less than the first duration, the fourth graphical representation being different from the first graphical representation and the second graphical representation.

12. The method according to claim 11, wherein the displaying the fourth graphical representation of the contour information comprises:

in response to the search duration of the search of the virtual container by the virtual object reaching the fourth duration, displaying the fourth graphical representation of the contour information of the first virtual prop at the first storage location, the fourth duration being less than the second duration.

13. The method according to claim 1, further comprising:

acquiring respective parameter values of the first and second virtual props;

determining the first and second storage locations according to the respective parameter values; and controlling sequential display of the first and second virtual props at the determined first and second storage locations.

14. The method according to claim 13, wherein the parameter values of each of the first virtual prop and the second virtual prop comprise at least one of a size of the respective virtual prop or a value of the respective virtual prop.

15. The method according to claim 1, wherein the displaying the first graphical representation of the first virtual prop comprises:

acquiring inspection state information corresponding to the first virtual prop, the inspection state information indicating whether the first virtual prop has been inspected by the virtual object; and displaying the first graphical representation of the first virtual prop at the first storage location in response to (i) the search duration of the search of the virtual container by the virtual object reaching the first duration and (ii) the inspection state information corresponding to the first virtual prop indicating that the first virtual prop has been inspected by the virtual object.

16. A virtual prop display apparatus, comprising:

processing circuitry configured to:

control display of a scene interface of a virtual scene in a virtual environment, the virtual scene comprising a virtual container;

receive a user operation to control a virtual object in the virtual environment to search the virtual container in the virtual scene;

in response to the user operation to control the virtual object to search the virtual container, control display of a search interface of the virtual container;

in response to a search duration of the search of the virtual container by the virtual object reaching a first duration that is acquired based on a first value of a specified type of attribute associated with a first virtual prop in the virtual container, control display, in the search interface, of a first graphical representation of the first virtual prop at a first storage location in the virtual container, the first graphical representation indicating that the first virtual prop is stored at the first storage location; and in response to the search duration of the search of the virtual container by the virtual object reaching a second duration that is acquired based on a second value of the specified type of attribute associated with the second virtual prop in the virtual container, control display, in the search interface, of a second graphical representation of a second virtual prop at a second storage location that is different from the first storage location, the second graphical representation being different from the first graphical representation.

17. The apparatus according to claim 16, wherein the second duration is different from the first duration, the first duration varies based on the first value of the specified type of attribute associated with the first virtual prop in the virtual container, and the second duration varies based on the second value of the specified type of attribute associated with the second virtual prop in the virtual container.

18. The apparatus according to claim 16, wherein the specified type of attribute comprises:

a quantity of the respective virtual prop, a weight of the respective virtual prop, a value of the respective virtual prop, a size of the respective virtual prop, or a type of the respective virtual prop.

19. The apparatus according to claim 18, wherein the specified type of attribute includes the weight or the size of the respective virtual prop.

20. A non-transitory computer-readable storage medium storing computer-readable instructions thereon, which, when executed by processing circuitry, cause the processing circuitry to perform a virtual prop display method comprising:

displaying a scene interface of a virtual scene in a virtual environment, the virtual scene comprising a virtual container;

receiving a user operation to control a virtual object in the virtual environment to search the virtual container in the virtual scene;

in response to the user operation to control the virtual object to search the virtual container, displaying a search interface of the virtual container;

in response to a search duration of the search of the virtual container by the virtual object reaching a first duration that is acquired based on a first value of a specified type of attribute associated with a first virtual prop in the virtual container, displaying, in the search interface, a first graphical representation of the first virtual prop at a first storage location in the virtual container, the first graphical representation indicating that the first virtual prop is stored at the first storage location; and in response to a search duration of the search of the virtual container by the virtual object reaching a second duration that is acquired based on a second value of the specified type of attribute associated with the second virtual prop in the virtual container, displaying, in the search interface, a second graphical representation of the second virtual prop at a second storage location that is different from the first storage location, the second graphical representation indicating that the second virtual prop is stored at the second storage location and being different from the first graphical representation.

* * * * *